(12) United States Patent
Oikawa et al.

(10) Patent No.: US 6,282,729 B1
(45) Date of Patent: Sep. 4, 2001

(54) WAIST PROTECTION MEMBER

(75) Inventors: Katsuhiko Oikawa, Kusatsu; Nanami Ozawa, Fukuchiyama; Rika Kowatari, Miyazu, all of (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 09/331,427

(22) PCT Filed: Dec. 19, 1997

(86) PCT No.: PCT/JP97/04710

§ 371 Date: Aug. 23, 1999

§ 102(e) Date: Aug. 23, 1999

(87) PCT Pub. No.: WO98/27835

PCT Pub. Date: Jul. 2, 1998

(30) Foreign Application Priority Data

Dec. 20, 1996 (JP) ................................. 8-341089

(51) Int. Cl.⁷ .................................................. A41D 13/00
(52) U.S. Cl. .................................................. 2/465; 602/23
(58) Field of Search ..................... 2/465, 69, 228, 2/231, 238, 267, 22–24, 455, 214, 227, 78.2, 48, 338, 401, 411, 413, 161.1, 164; 602/23, 61

(56) References Cited

U.S. PATENT DOCUMENTS

| | | | |
|---|---|---|---|
| Re. 34,573 | * 4/1994 | Calvert | 2/455 |
| 4,370,754 | * 2/1983 | Donzis | 2/455 |
| 4,441,211 | * 4/1984 | Donzis | 2/455 |
| 4,573,216 | 3/1986 | Wortberg . | |
| 4,700,407 | * 10/1987 | Mattila | 2/23 |
| 4,894,867 | * 1/1990 | Ceravolo et al. | 2/238 |
| 4,945,571 | * 8/1990 | Calvert | 2/455 |
| 5,034,998 | 7/1991 | Kolsky . | |
| 5,149,588 | 9/1992 | Fukushima et al. . | |
| 5,497,511 | 3/1996 | Zade . | |
| 5,551,082 | 9/1996 | Stewart et al. . | |
| 5,599,290 | * 2/1997 | Hayes et al. | 602/61 |
| 5,689,836 | * 11/1997 | Fee et al. | 2/465 |
| 5,717,997 | * 2/1998 | Garcia | 2/23 |
| 5,787,505 | * 8/1998 | Piwko et al. | 2/115 |
| 5,918,310 | * 7/1999 | Farahany | 2/23 |
| 6,009,565 | * 1/2000 | Carrington | 2/455 |

FOREIGN PATENT DOCUMENTS

| | | |
|---|---|---|
| 57-18619 | 1/1982 | (JP) . |
| 3-63519 | 6/1991 | (JP) . |
| 7-331507 | 12/1995 | (JP) . |
| 8-209409 | 8/1996 | (JP) . |
| 94/12066 | 6/1994 | (WO) . |
| 96/28055 | 9/1996 | (WO) . |

* cited by examiner

Primary Examiner—John J. Calvert
Assistant Examiner—Tejash Patel
(74) Attorney, Agent, or Firm—Wenderoth, Lind & Ponack, L.L.P.

(57) ABSTRACT

A waist protection member comprises a primary chamber (33) to be placed against at least an area of the human body surface in correspondence to a greater trochanter (1a) of a femur (1), and is fined with a gel-like substance (32). The waist protection member also comprises at least two auxiliary chambers (34) which are vertically juxtaposed to be placed against an area of the human body surface forwardly of the area covered with the primary chamber (33), and which are each filled with the gel-like substance (32) and have a smaller contact area with the human body than does the primary chamber.

22 Claims, 26 Drawing Sheets

WAIST PROTECTION MEMBER

BACKGROUND OF THE INVENTION

1. Technical Field

The present invention relates to a waist protection member for protection of a femur and more particularly, to a waist protection member suitable for the prevention of femur injury and fracture upon falling of elder persons with their bones weakened due to osteoporosis.

2. Background Art

Protection members have been conventionally provided for the protection of specific areas of human bodies from impact associated with falls or collisions. In general, the protection members of this type employ, as an impact absorber, various types of foamed resin materials, nonwoven fabrics or fluids such as air, and are adapted for attachment to specific areas ofthe human body. Protection members of various specifications have been proposed so as to conform to contours of protected human body areas such as the arm, breast and the like.

Figure 27:
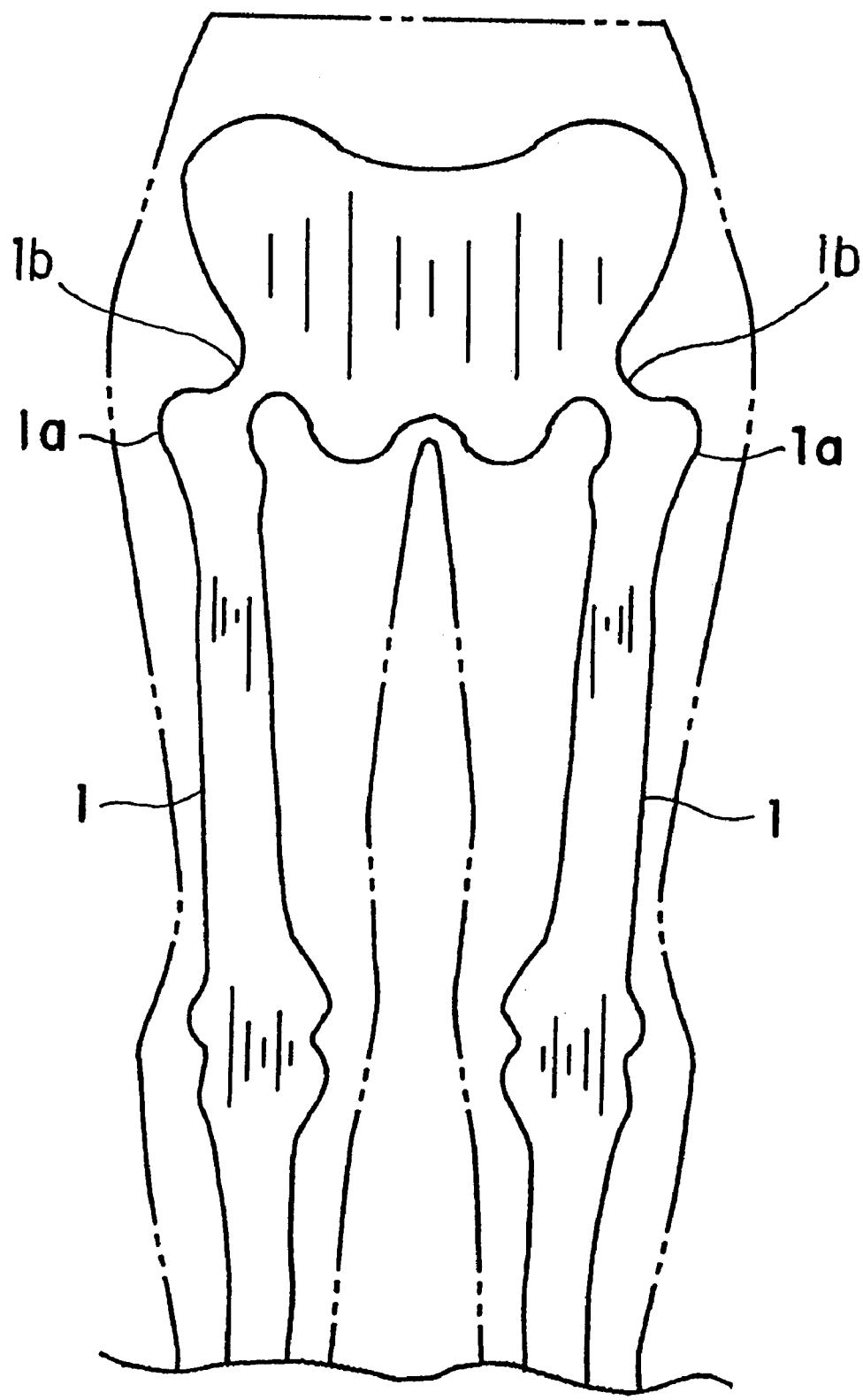

Upon impact to a lower body part due to a fall or the like, a great impact force is applied to a greater trochanter $1a$ of a femur 1 shown in FIG. 27. Therefore, in the case of falls of the elderly whose bones are weakened due to osteoporosis, they often sustain injury or fracture of a portion of the femur 1 and particularly of a cervical part $1b$ thereof Currently, such injuries or fractures of the elderly have become a social problem. Thus, various efforts have been paid to the protection of various human body areas and particularly, of the greater trochanter and its peripheral area (a waist area or a hip area).

Figure 28A:
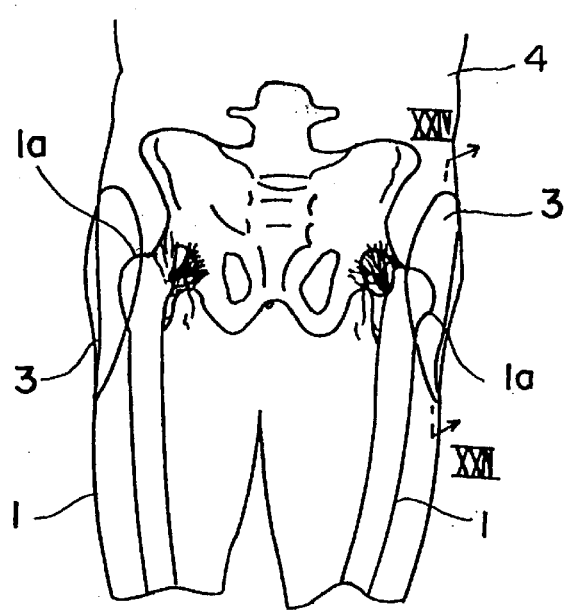
Figure 28B:
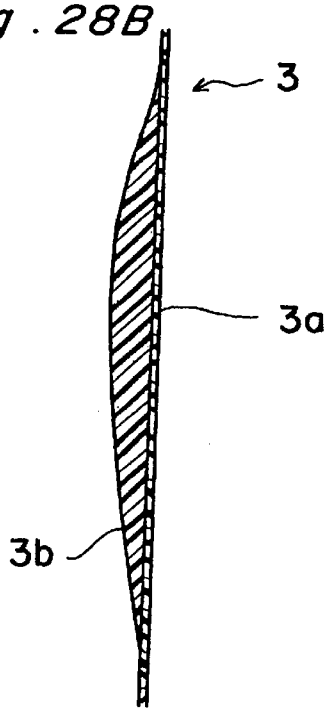

For example, as shown in FIGS. 28A and 28B, U.S. Pat. No. 4,573,216 discloses a protection member 3 for the protection of the waist area including the greater trochanter $1a$. This protection member 3 is substantially of an elongate ellipse shape. The device has a double-layer structure which includes an inner layer $3a$ formed of a partially cross-linked silicone rubber and placed against a surface of a human body 4, and an outer layer $3b$ formed of a cross-linked silicone rubber. This protection member 3 has a bell-shaped cross section wherein the thickness is the greatest at a portion corresponding to the greater trochanter $1a$ and gradually decreases toward a periphery ofthe member. The inner layer $3a$ has a thickness of not more than 40 mm. A total thickness combining those of the inner layer $3a$ and the outer layer $3b$ is in the range of 20 to 50 mm.

Figure 29:
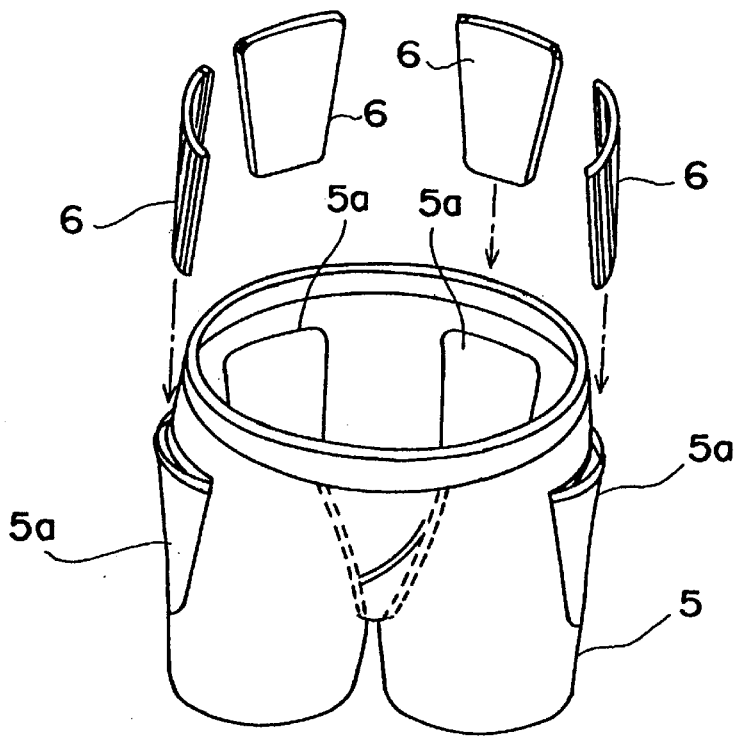

As shown in FIG. 29, another protection member 6 is disclosed in U.S. Pat. No. 5,497,511. The device is formed of a resin material and placed within a pocket $5a$ of pants 5.

Figure 30A:
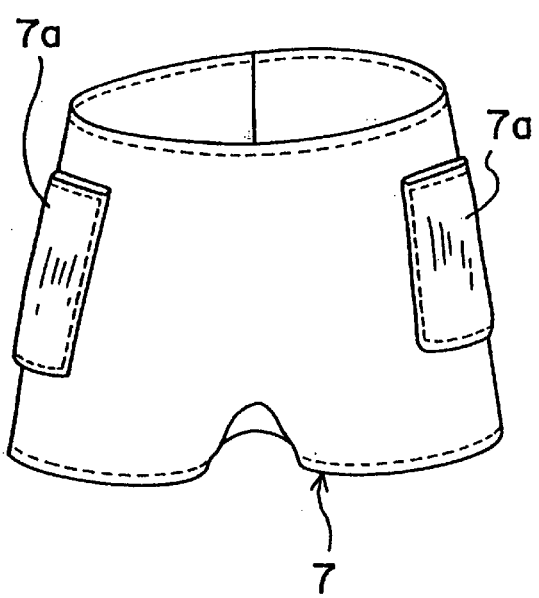
Figure 30B:
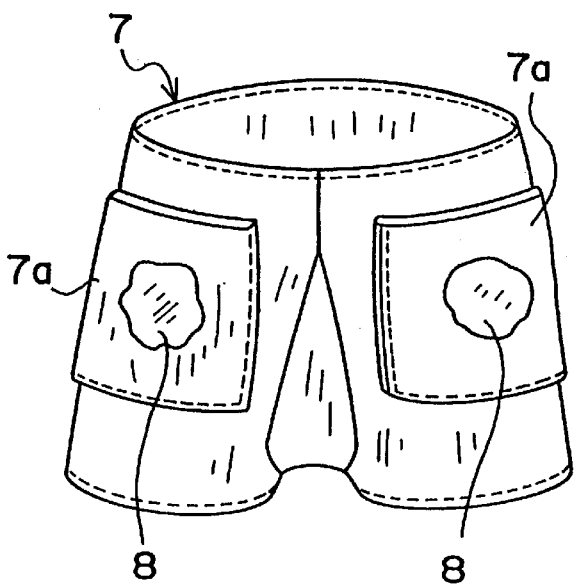

Further, as shown in FIGS. 30A and 30B, in Japanese patent application No. 7-62520 (Japanese laid-open application No. 8-209409), the present applicants have previously proposed a protection member 8 adapted for placement in pockets $7a$, $7a$ positioned at lateral-sides of pants 7 and composed of a gel-like substance.

Figure 31A:
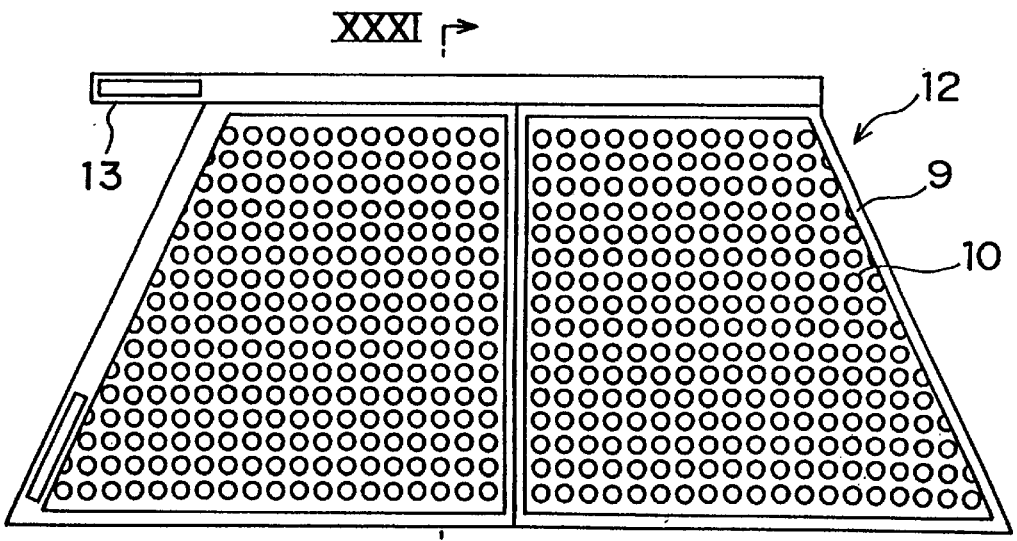
Figure 31B:
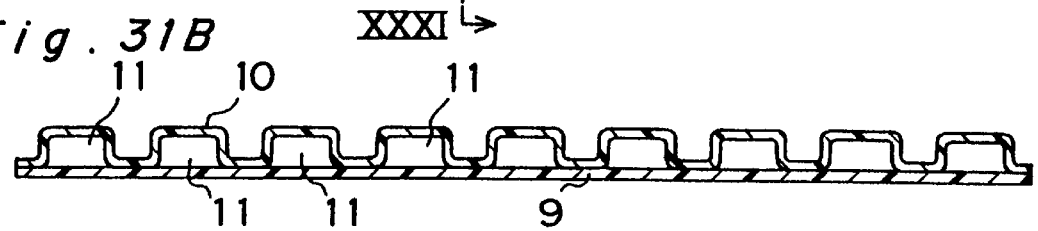

As shown in FIGS. 31A and 31B, another protection member 12 is disclosed in U.S. Pat. No. 5,034,998. This protection member takes the form of a skirt, comprising a polymer sheet base 9 formed of an air-impermeable polymer material, such as polyethylene, polyvinyl chloride, polypropylene or the like. The protection member also has a bubble layer 10 which includes a plurality of recesses circular in section and is adhesively or ultra-sonically bonded to the sheet base 9 for defining a plurality of fluid filled chambers 11. The chambers 11 are filled with fluid such as a gas like air or a liquid like water. In FIG. 31 A, a reference numeral 13 denotes a tensile belt strip with a fastener element for attachment of the member to a lower body part.

However, the protection member 3 of above mentioned U.S. Pat. No. 4,573,216 shown in FIGS. 28A and 28B is designed such that one piece of protection member 3 serves to protect the greater trochanter $1a$ and its peripheral area, and hence, has a great surface area (contact area) in abutment against or in contact with the human body surface 4. Furthermore, as mentioned above, the protection member 3 has a thickness as great as 20 to 50 mm. Therefore, the protection member 3 is incapable of deforming in a manner to fully follow the movement of the human body 4 at the greater trochanter $1a$ and its peripheral area. Consequently, when worn, this protection member 3 restricts the movement of the human body 4, causing discomfort to a wearer. Furthermore, the protection member 3 has a relatively great weight, resulting in poor wear comfort.

The protection member 6 of above-mentioned U.S. Pat. No. 5,497,511 shown in the FIG. 29, also has a great contact area with the human body and a relatively high hardness, resulting in poor conformability to the movement of the human body and poor wear comfort.

Since the protection member 8 of FIGS. 30A and 30B proposed by the present applicants is formed of a gel-like substance, the protection member 8 is more flexible than the protection members 3, 6 shown in FIGS. 28A, 28B and 29. However, this protection member 8 also has great contact area with the human body, resulting in insufficient conformability to the movement of the human body.

The protection member 12 of U.S. Pat. No. 5,034,998 shown in FIGS. 31A and 31B has an arrangement wherein the plural fluid chambers 11 establish respective point contacts with the human body so as to define a small contact area with the human body. However, when this protection member 12 is worn, the one piece of polymer sheet base 9 covers all the fore, back and lateral areas of the waist, thus restricting the movement of the wearer. In addition, a fear exists that any of the fluid chambers 11 may rupture to cause the gas or liquid filled therein to escape.

SUMMARY OF THE INVENTION

The present invention has been accomplished for solving the problems of the conventional protection members of this type and has an object to provide a waist protection member featuring good conformability to the movement of the human body, nice wear comfort, and a capability of sufficiently reducing the impact due to a fall or the like.

For achieving the above object, the waist protection member according to the invention comprises a primary chamber to be placed against at least an area of the human body surface in correspondence to the greater trochanter ofthe femur and filed with a gel-like substance, and at least two auxiliary chambers which are vertically juxtaposed to be placed against an area of the human body surface forwardly ofthe area covered with the primary chamber, and which are each filled with the gel-like substance, and with each having a smaller contact area with the human body than the primary chamber.

The waist protection member according to the invention is configured as mentioned above so that when the impact force is applied to the greater trochanter due to falling or the like of the wearer, this impact force is absorbed by the deformation of the gel-like substance in the primary chamber. When the impact force due to fall or the like is applied to the area forward of the greater trochanter, the impact is absorbed by the gel-like substance in the auxiliary chambers. Hence, the waist protection member of the invention is adapted for sufficient reduction of the impact to the greater trochanter upon a fall or the like.

The aforementioned gel-like substance is flexible enough to present a high fitness to the human body surface. Hence, the primary and auxiliary chambers are permitted to deform in a manner to follow the movement of the human body. As a result, the greater trochanter and its peripheral area are surely covered by the primary chamber 33 regardless of the position assumed by the human body.

Furthermore, two or more auxiliary chambers with the smaller contact area are disposed forwardly of the primary chamber so that the wearer may not suffer interference with the movement to bend the upper body part forwardly or to lift up the thigh. Thus, the wearer is allowed to make these movements without feeling discomfort.

Thus, the waist protection member according the invention is excellent in the fitness to the human body surface and the conformable to the moving human body, and hence, is suitable to be worn commonly.

The waist protection member of the invention is particularly suitable for use as the protection of the elderly persons' femurs weakened due to osteoporosis.

The gel-like substance is preferably composed of silicone gel or urethane gel having excellent impact absorption. Examples of other usable gel-like substances include polyvinyl alcohol gel, gelatin gel, acrylic gel and the like. The hardness (C Scale) of the gel-like substance is preferably in the range on order of 0 to 40 as determined by the hardness test method set forth in JIS S6050-1988.

The thickness of the primary chamber and auxiliary chamber is preferably not less than 3 mm and not more than 10 mm. If the thickness is less than 3 mmn, sufficient impact absorption is not attained. On the other hand, if the thickness exceeds 10 mm, the waist protection member becomes too heavy to be suitable for common wear.

The primary chamber may be composed of a plurality of compartment chambers arranged in close proximity to one another. In this case, the conformability to the movement of the human body at the greater trochanter and its peripheral area is further enhanced.

The peripheral walls of the primary chamber and auxiliary chambers be formed of a urethane resin sheet or a soft vinyl chloride sheet. Otherwise, the peripheral walls may include an inner layer formed of the urethane resin sheet or the soft vinyl chloride sheet and an outer layer formed of a knit textile material.

The invention further provides a waist protection member comprising a primary chamber to be placed against at least an area of the human body surface in correspondence to the greater trochanter of the femur and filled with a gel-like substance and a foamed material, and an auxiliary chamber to be placed against an area of the human body surface forwardly of the area covered with the primary chamber and filled with the gel-like substance and the foamed material.

With such a structure, the waist protection member can be reduced in weight as compared with the case where the primary chamber and auxiliary chambers are entirely filled with only the gel-like substance.

The invention further provides a garment for a lower body part, to which the above waist protection member is secured or removably attached. The garment for the lower body part may be an underwear for the lower body part to be directly worn on the body surface or may be one to be worn over the underwear for the lower body part. Specifically, the garments for the lower body part include briefs, trunks, long pants such as cycling pants, long-legged close-fitting shorts and the like, short pants such as short drawers, trousers, culottes, slts and the like.

Figure 6:
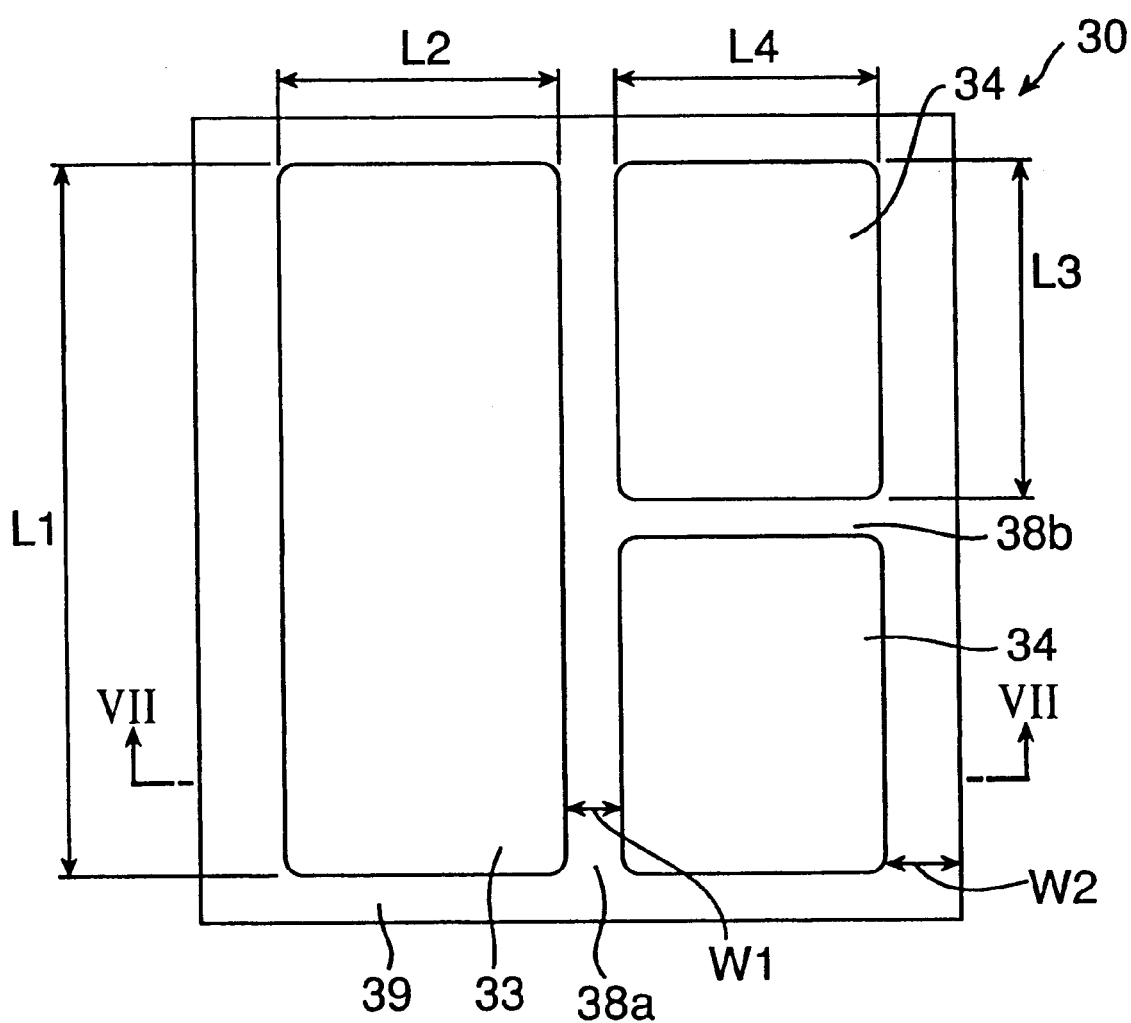
Figure 7:
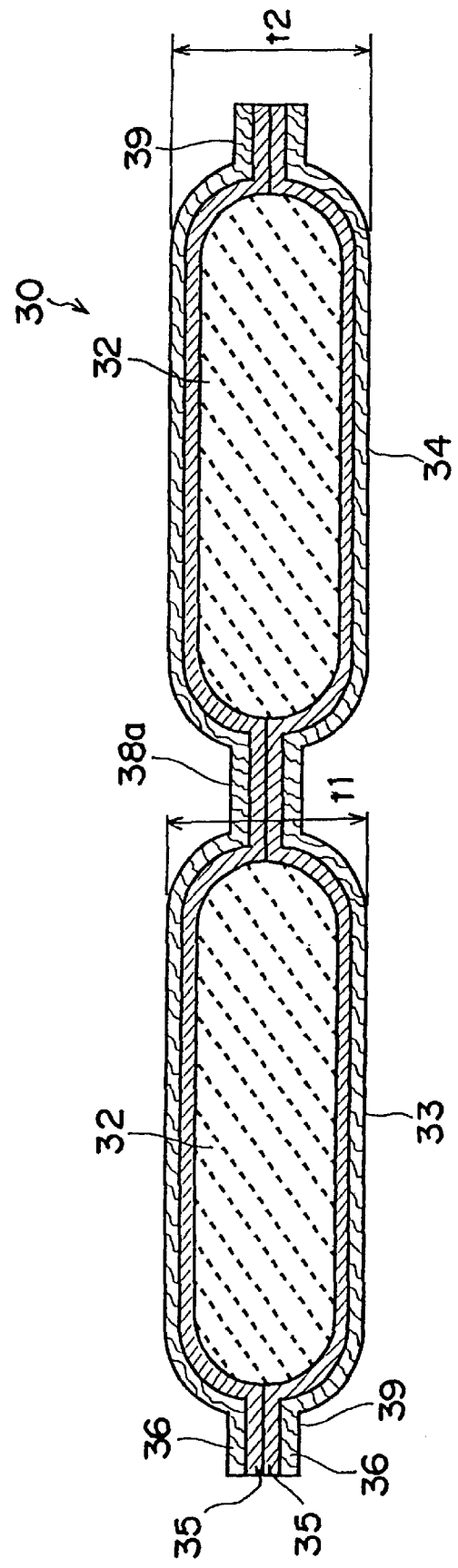
Figure 8:
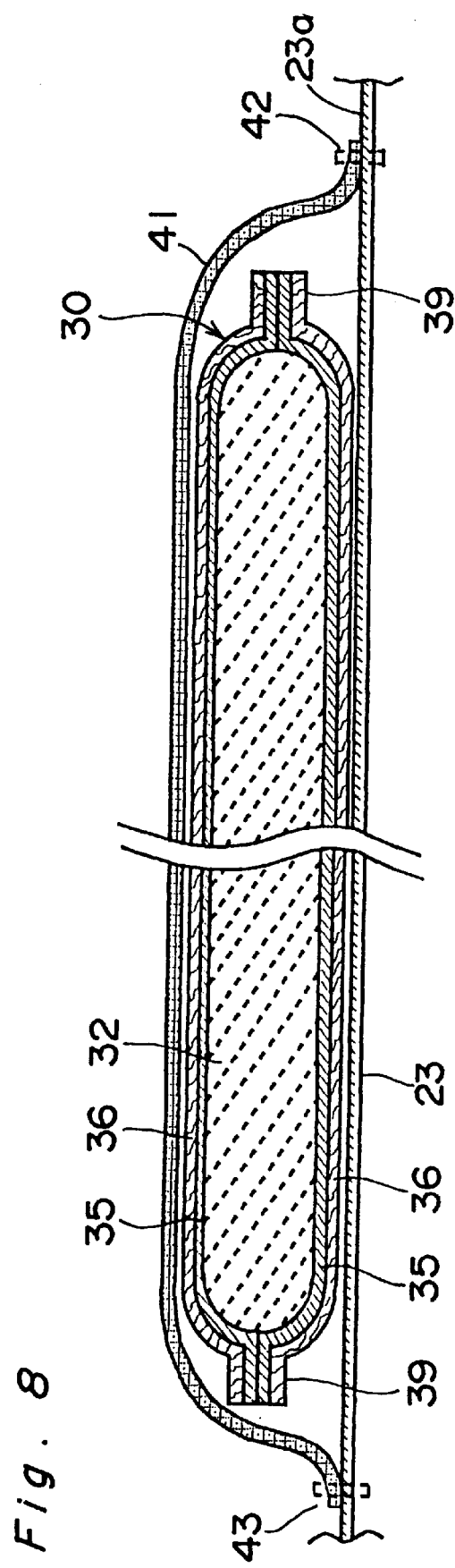
Figure 9:
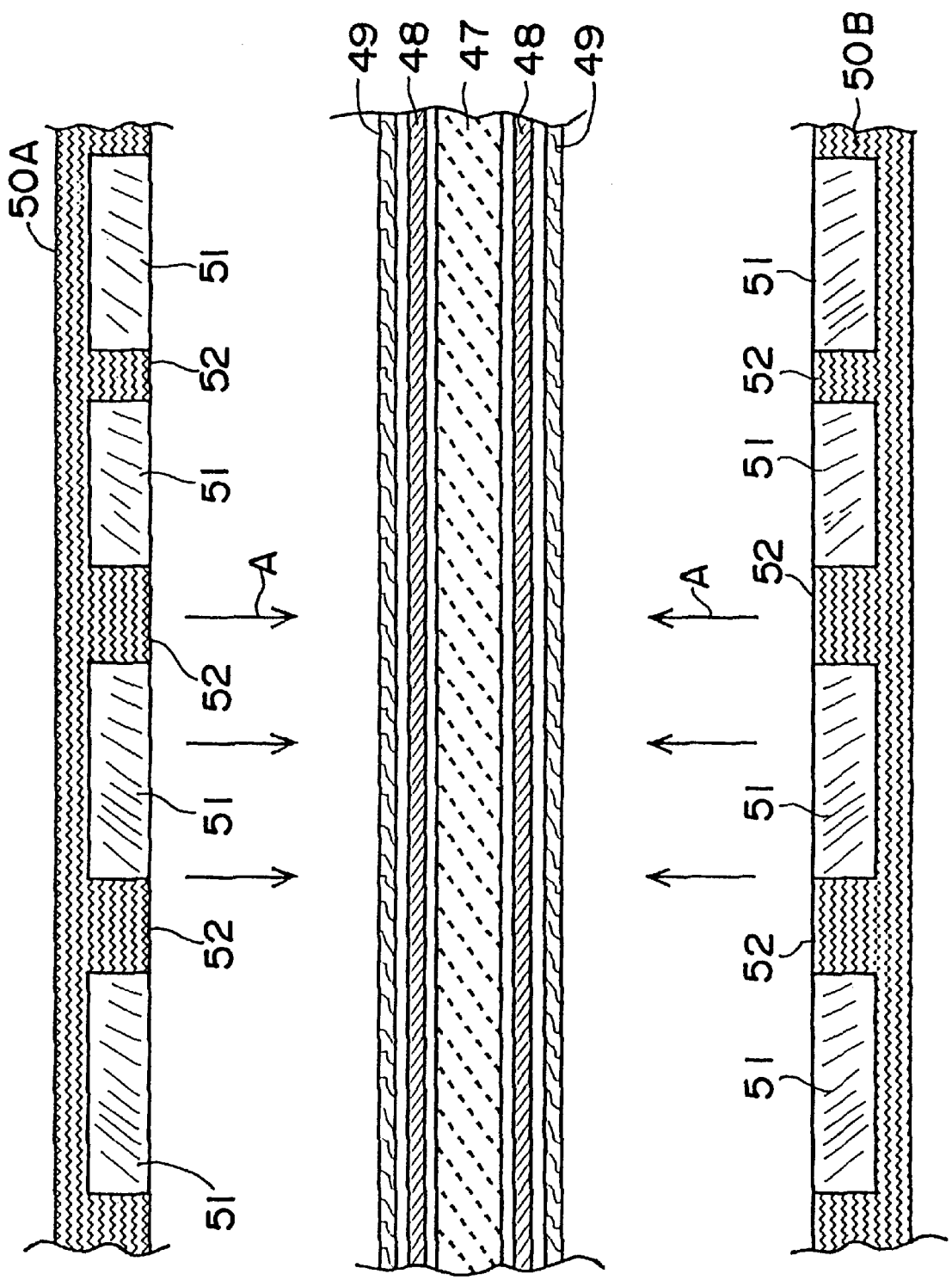
Figure 10:
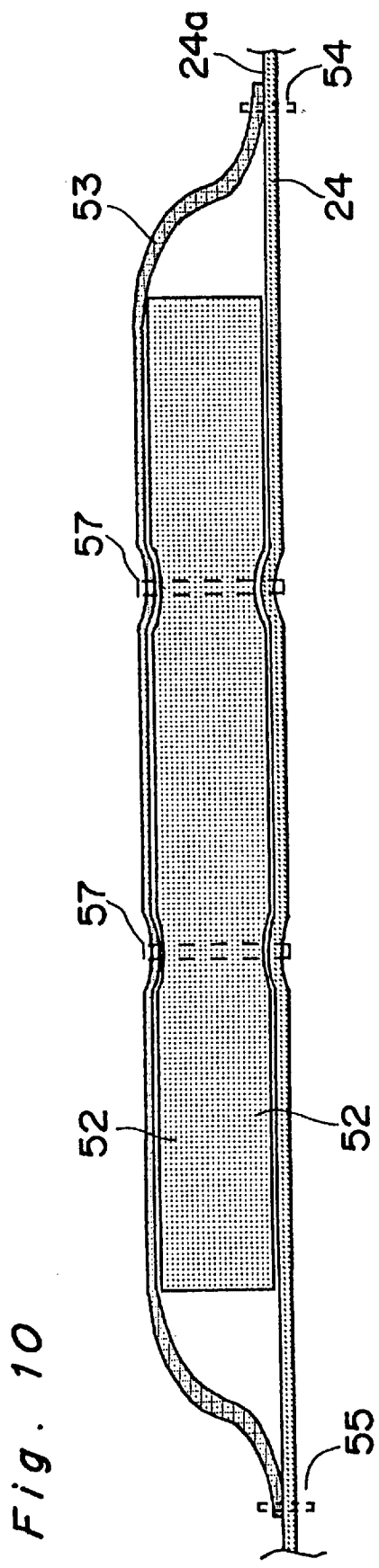

As shown in FIGS. 6 and 7, the waist protection member 30 is of a rectangular sheet and includes one primary chamber 33 and two auxiliary chambers 34, 34 which are each filled with a gel-like substance 32 as an impact absorber. Walls of the primary chamber 33 and auxiliary chambers 34, 34 are defined by inner layers 35, 35 formed of a pair of sheet members. There are further laid a pair of outer layers 36, 36 on the outside of the inner layers 35, 35. Grooves 38a, 38b are disposed at respective gaps between the primary chamber 33 and the auxiliary chambers 34 and between the auxiliary chambers 34. The grooves 38a, 38b are formed by fusion bonding respective portions of the inner layers 35,35 and the outer layers 36,36 in an integral manner. At an outer peripheral edge 39 of the waist protection member 30, respective portions of the inner layers 35, 35 and the outer layers 36, 36 are also fusion bonded in the integral manner.

The two auxiliary chambers 34, 34 are vertically juxtaposed near one side of the primary chamber 33. Similarly to the primary chamber 33, each auxiliary chamber 34 is shaped like a flat rectangular parallelepiped, having a thickness t2 of 7.5 mm, a vertical length L3 of 75 mm and a transverse length L4 of 65 mm. The auxiliary chamber has a smaller contact area with the human body than does the primary chamber 33.

Figure 1:
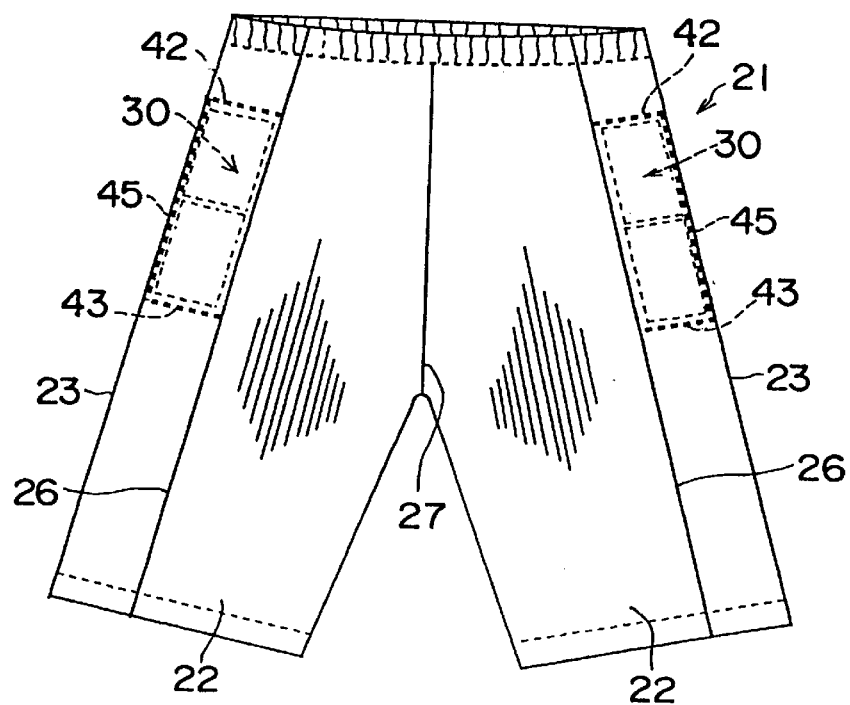
Figure 2:
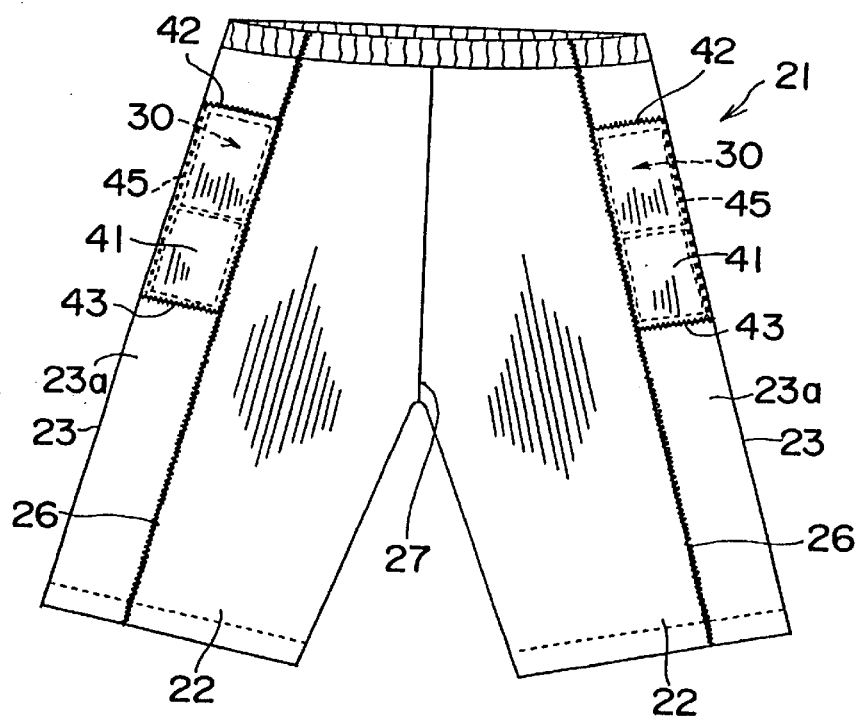
Figure 3:
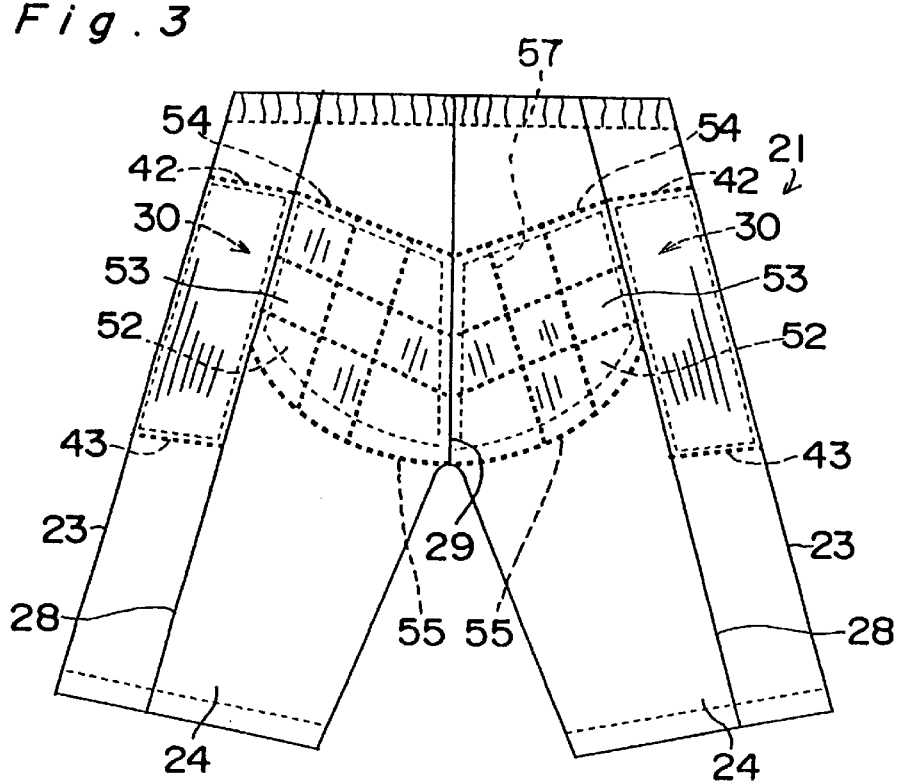
Figure 4:
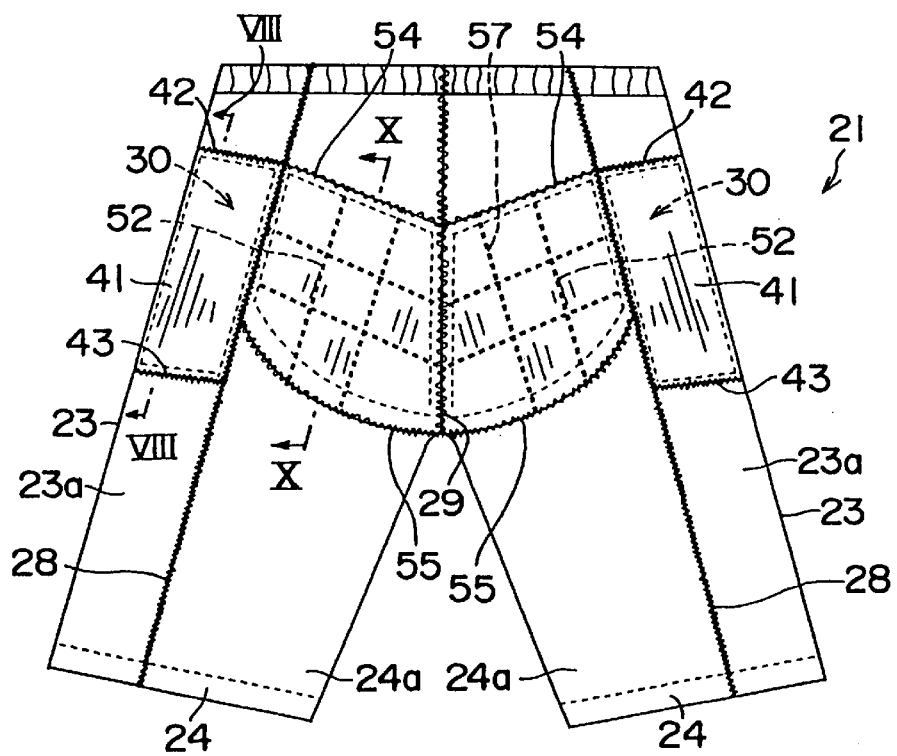
Figure 5:
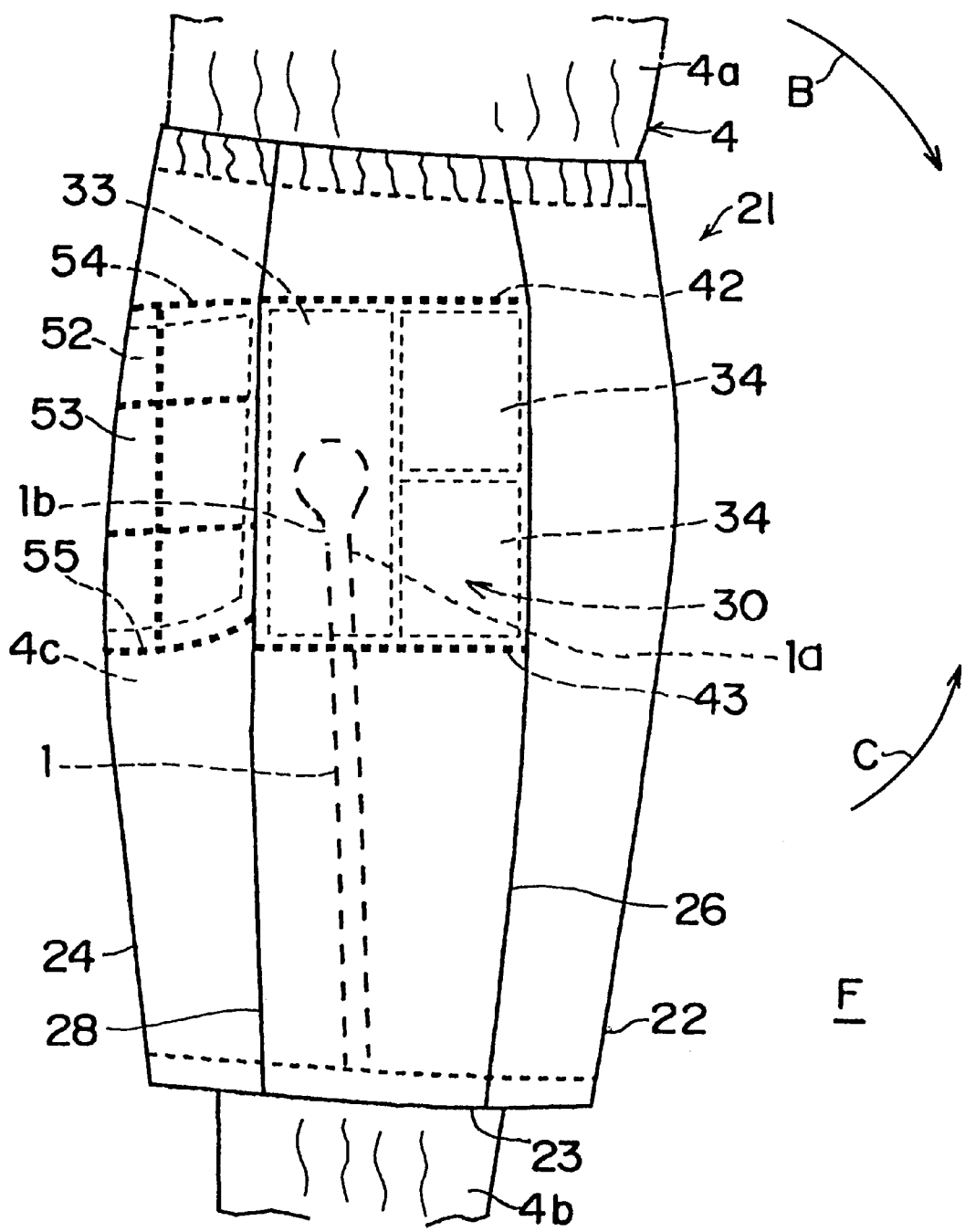

As shown in FIG. 5, an attachment position of the hip-portion protection member 30 is set such that when long pants 21 are worn, the primary chamber 33 covers the greater trochanter 1a of the femur 1 and its peripheral area while the auxiliary chambers 34, 34 cover an area situated in forward position F of the area covered by the primary chamber 33.

The gel-like substance 32 filled in the primary chamber 33 and auxiliary chambers 34, 34 is in a state intermediate between solid and liquid, or a jelly substance having some resilience. The gel-like substance is not particularly limited as long as such substance presents properties of a gel-like substance. However, the hardness of the substance is preferably in the range on the order of 0 to 40 (C Scale) determined by the hardness test method set forth in JIS S6050-1988.

The inner layer 35 has a greater hardness than the gel-like substance 32 because it defines an inner side of the peripheral wall of the primary chamber 33 and auxiliary chambers 34 which are filled with the gel-like substance 32 as the impact absorber. However, the inner layer 35 is required to deform quickly upon application of an impact force for transferring the impact force to the gel-like substance 32. Further, the inner layer 35 is required to have elastic restoration characteristics for quick restoration to the original shape of the demise of the impact force. Furthermore, a material for forming an inner layer 35 is required to be of good workability including formability, suitability for adhesion, fusibility and the like. Specifically, examples of a material satisfying these conditions include elastomeric materials with rubber elasticity, such as synthetic butadiene rubbers, urethane resin, silicone gel, polyamide rubbers and the like; and a sheet material such as formed of soft vinyl chloride.

The thickness of the inner layer 35 is preferably in the range on the order of 50 to 500 $\mu$m and more preferably of 100 to 300 $\mu$m.

The outer layer 36 is required to exhibit a certain degree of strength because it functions to reinforce the inner layer 35. Since the outer layer 36 defines a surface of the waist protection member 30, it is preferably soft and comfortable. In addition, the outer layer 36 must have such a sufficient flexibility so as to not interfere with the deformation of the gel-like substance 32 and the inner layer 35.

A pair of dies 50A, 50B are previously heated in a hot pressing machine to temperatures on the order of 140 to 200° C. corresponding to fusing temperatures at which he polyurethane resin sheet 48 and the stockinet fabric piece 49 are fused to each other. The dies 50A, 50B each include recesses 51 corresponding to the primary chamber 33 and auxiliary chambers 34, and projections 52 corresponding to the grooves 38a, 38b and outer peripheral edges 39. Each recess 51 is 3.5 mm in depth so that a closed space defined by the combined dies 50A, 50B may have a depth of 7.0 mm.

Furthermore, the auxiliary chambers 34, 34 with the smaller contact area than the primary chamber 33 are vertically juxtaposed on the area forwardly of the femur 1. This reduces the interference with a movement to bend an upper body 4a forwardly as indicated by Arrow B in FIG. 5 or a movement to lift up a thigh 4b as indicated by Arrow C in FIG. 5. Thus, the wearer ofthe long pants 5 is allowed to make these movements without feeling discomfort.

Thus, the long pants 21 provided with the waist protection member 30 of this embodiment ensures the protection of the greater trochanter 1a from the impact of falls or the like and also presents excellent conformability to the movement of the human body and good wear comfort. the greater trochanter 1a of the femur 1 and its peripheral area are covered with the primary chamber 33 having a great contact area. Therefore, when the impact force is applied to the area in correspondence to the greater trochanter la of the femur 1 upon falling of the wearer, this impact force is absorbed by the deformation of the gel-like substance 32 within the primary chamber 33. On the other hand, the two auxiliary chambers 34, 34 are located at the area situated in forward position F of the area covered by the primary chamber 33. Therefore, even when the impact force due to the fall or the like is applied to an area out of correspondence to the greater trochanter 1a, this impact force is absorbed by the gel-like substance 32 within the auxiliary chambers 34, 34 so that the impact transferred to the greater trochanter 1a is reduced.

As mentioned above, the gel-like substance 32, which is filled in the primary chamber 33 and the auxiliary chambers 34, 34 as the impact absorber, is softer than the rubber elastic materials, foamed materials and the like, thus presenting superior fitness to the projections and depressions on the human body surface. Therefore, the primary chamber 33 is allowed to deform in a manner to follow the movement of the human body 4. Whatever position the human body 4 may assume, the greater trochanter area 1a is surely covered with the primary chamber 33.

Further, as mentioned above, the gel-like substance 32 is so soft and comfortable. Therefore, the long pants 21 provided with the waist portion protection member 30 presents a higher degree of wear comfort than cases where the pants are provided with a waist protection member such as formed of the rubber elastic material, foamed material or the like. Besides, in an event where the inner layer 35 and the outer layer 36 rupture during use, the gel-like substance 32 is less likely to escape from the primary chamber 33 and auxiliary chambers 34 than the gas or liquid.

Furthermore, the auxiliary chambers 34, 34 with the smaller contact area than the primary chamber 33 are vertically juxtaposed on the area forwardly of the femur 1. This reduces the interference with a movement to bend down an upper body part 4a forwardly as indicated by Arrow B in FIG. 5 or a movement to lift up a thigh 4b as indicated by Arrow C in FIG. 5. Thus, the wearer of the long pants 5 is allowed to take these movements without feeling discomfort.

Owing to the great contact area of the primary chamber, the greater trochanter 1a and its peripheral area are surely covered with the primary chamber 33, even if the placement of the waist protection member 30 is somewhat displaced or if the position of the greater trochanter 1a varies because of difference in proportions according to respective wearers. Furthermore, even if the greater trochanter 1a is not covered with the primary chamber 33, it is covered with the auxiliary chambers 34.

Thus, the long pants 20 provided with the waist protection member 30 of this embodiment ensures the protection of the greater trochanter 1a from the impact of falls or the like and also present excellent conformability to the movement of the human body and good wear comfort.

As shown in FIGS. 3 to 5 and 10, the rear fabric pieces 24, 24 are provided with buttock protection members 52, 52 at places to cover a gluteal area 4c of the human body 4. The buttock protection member 52 is held between an inside 24a of the rear fabric piece 24 and a lining fabric piece 53 which is securely sewn to the rear-body fabric piece 24 on seam sections 28, 29, 54 and 55 which are defined along peripheral edges thereof. There is further defined a seam section 57 on which the rear fabric piece 24, the buttock protection member 52 and the lining fabric piece 53 are sewn together.

Considerations need to be given to the perspiration and feel because the gluteal area 4c of the human body 4 closely contacts with a seat when the wearer is seated. Accordingly, it is desirable to form the buttock protection member 52 of an elastic material excellent in air permeability and flexibility. Specifically, the use of an elastic material, such as thermoplastic elastomer foams, acrylic foams, polyurethane rubbers and the like, is preferred. In this embodiment, the buttock protection member 52 is formed of a flat-shaped member of polyurethane rubber. The provision of such a buttock protection member 52 may provide the protection ofthe ischium from injury resulting from the impact to the gluteal area 4c due to a fall to the ground.

It is noted that likewise to the waist protection member 30, the buttock protection member 52 may be composed of the flat-shaped member wherein the gel-like substance is filled in the chambers.

Second Embodiment

Figure 11:
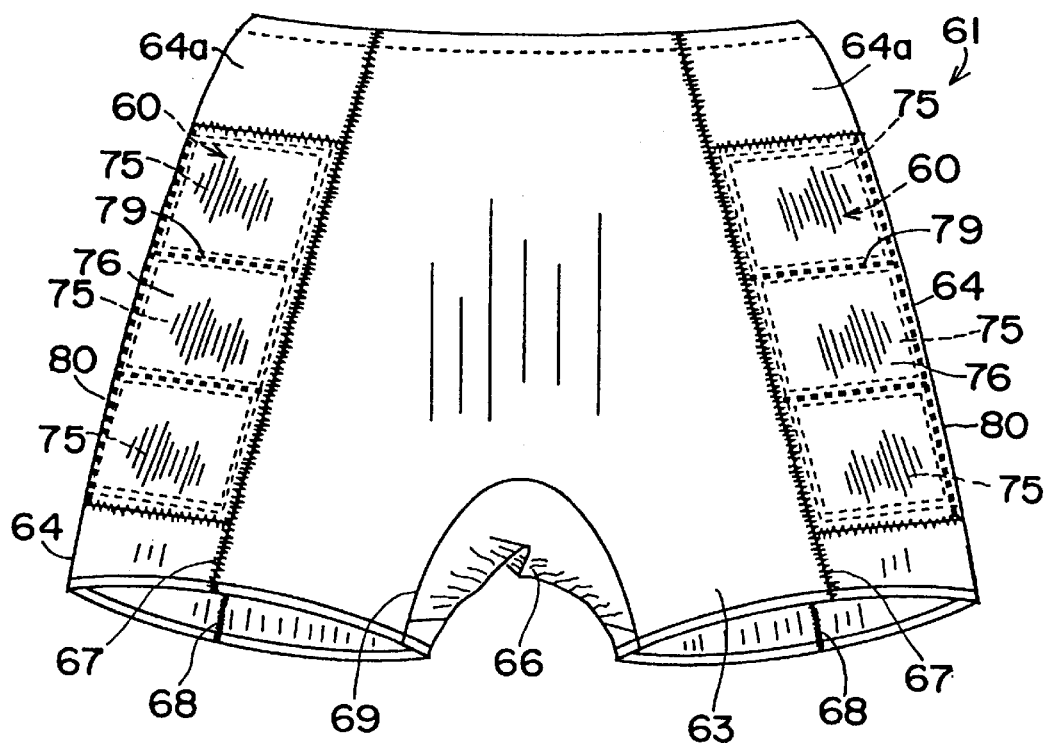
Figure 12:
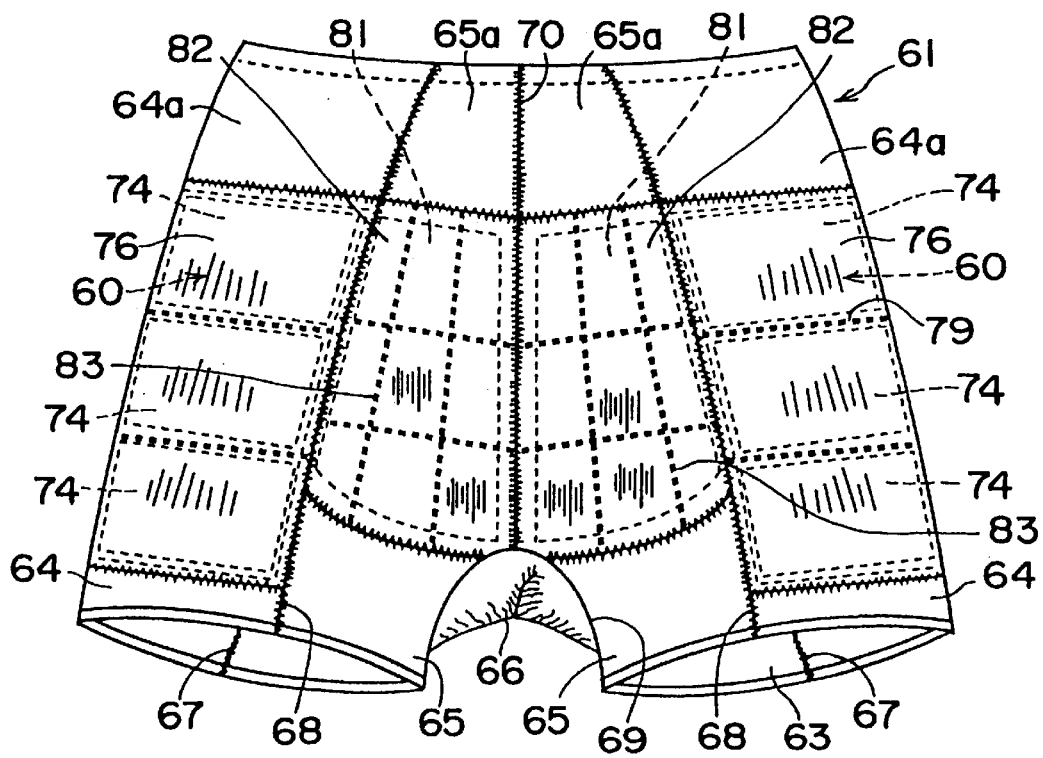

As shown in FIGS. 11 and 12, short pants 61 (pants such as short drawers which have a relatively short length for covering the region from the waist to upper ends of the thighs) are provided with a waist protection member 60 according to a second embodiment of the invention. The waist protection member 60 includes a front fabric piece 63, side fabric pieces 64, 64, rear fabric pieces 65, 65, and a crotch fabric piece 66, which are combined together on sewing seam sections 67 to 70.

Figure 13:
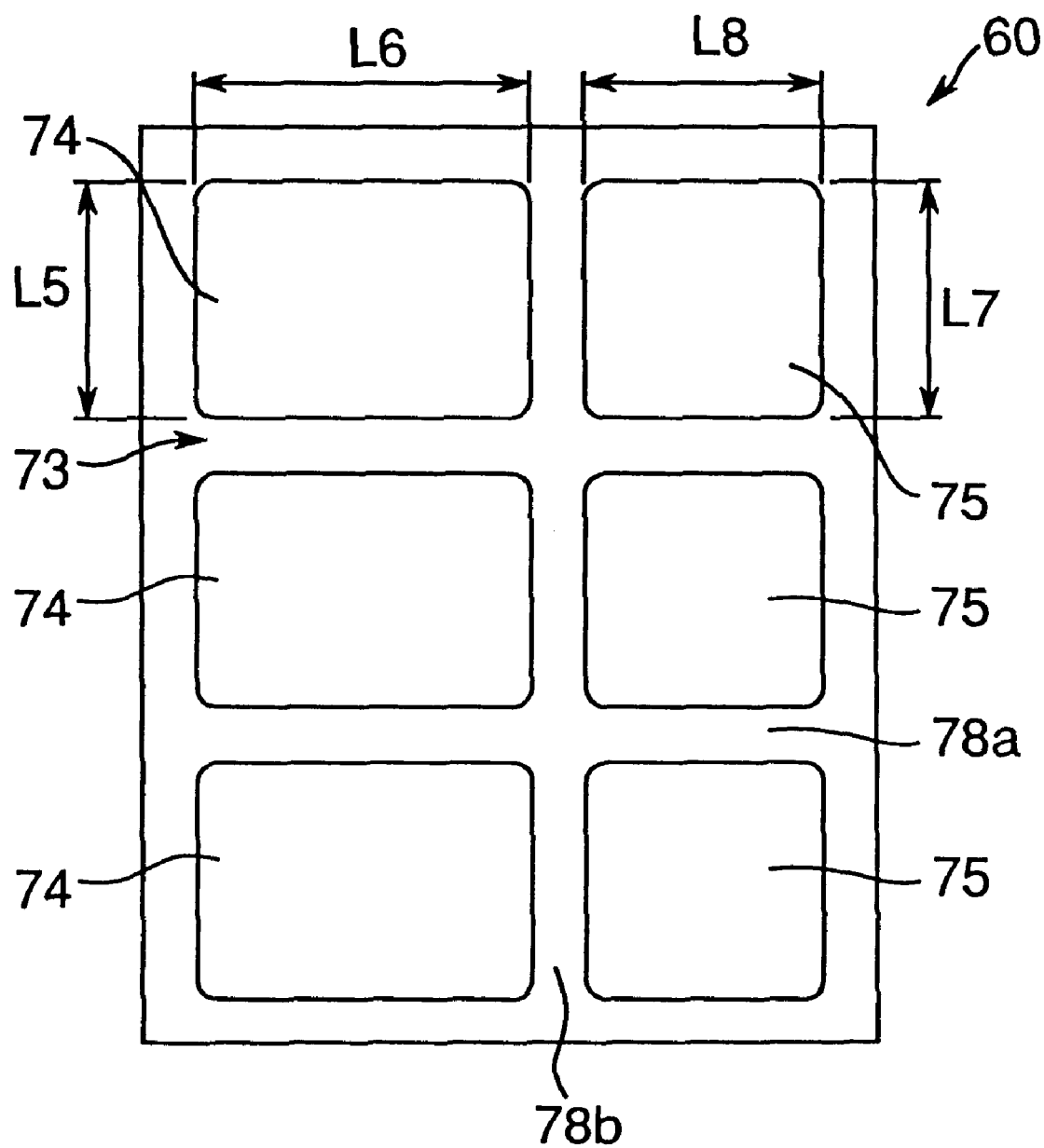

As shown in FIG. 13, a primary chamber 73 of the waist protection member 60 consists of three independent compartment chambers 74 vertically arranged. Each compartment chamber 74 is of a rectangular shape, having a vertical length L5 of 50 mm and a transverse length L6 of 70 mm. Disposed near one side of each compartment chamber 74 is an auxiliary chamber 75 of 50 mm in vertical length L7 and transverse length L8.

Similarly to the first embodiment, the waist protection member 60 is held between an inside 64a of the side fabric piece 64 and a lining fabric piece 76 sewn to the side fabric piece 64 and is also secured to the side fabric piece 64 on seam sections 79, 80 along grooves 78a, 78b. The waist protection member 60 is positioned in a manner that when the short pants 61 are worn, the primary chamber 73 including the three compartment chambers 74 covers the greater trochanter and its peripheral area while the three auxiliary chambers 75 cover an area forward thereof.

In the second embodiment, the fitness to the human body is further enhanced because the individual compartment chambers 74 constituting the primary chamber 73 have a smaller contact area than the single and large primary chamber of the first embodiment. Furthermore, an even higher conformability to the movement of the human body is provided when movement is taken to bend down the human body forwardly or to lift up the thigh.

It is noted that a buttock protection member 81 including a flat-shaped member of a polyurethane rubber material is attached to an inside 65a of the rear-body fabric piece 65 similarly to the first embodiment. The buttock protection member 81 is held between a lining fabric piece 82 sewn to the rear fabric piece 65 and the rear fabric piece 65. Further, the buttock protection member 81 is also sewn to the rear fabric piece 65 on a seam section 83.

The configuration of the other portions and the operation of the second embodiment are the same as those of the first embodiment.

Third Embodiment

Figure 14:
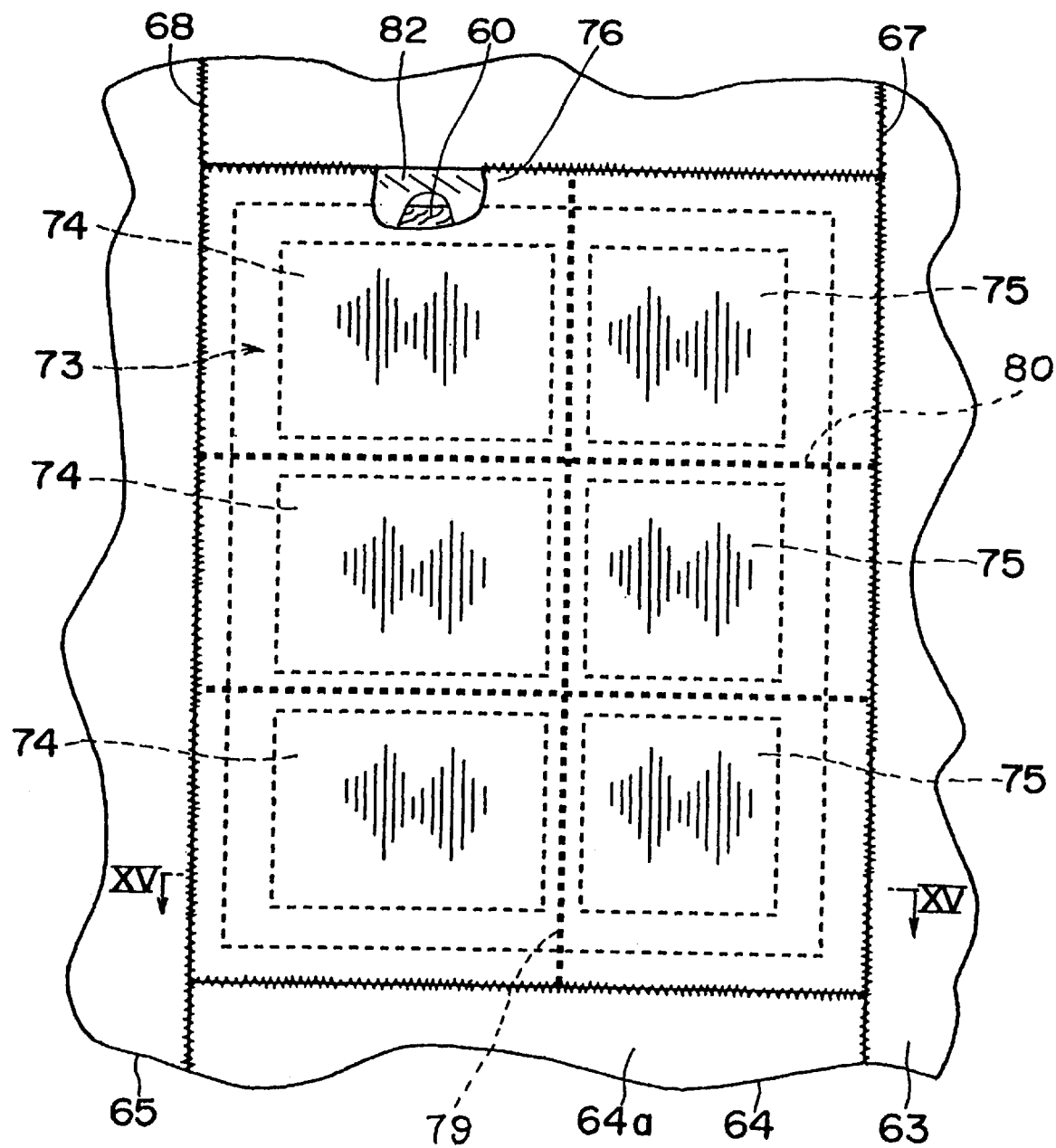
Figure 15:
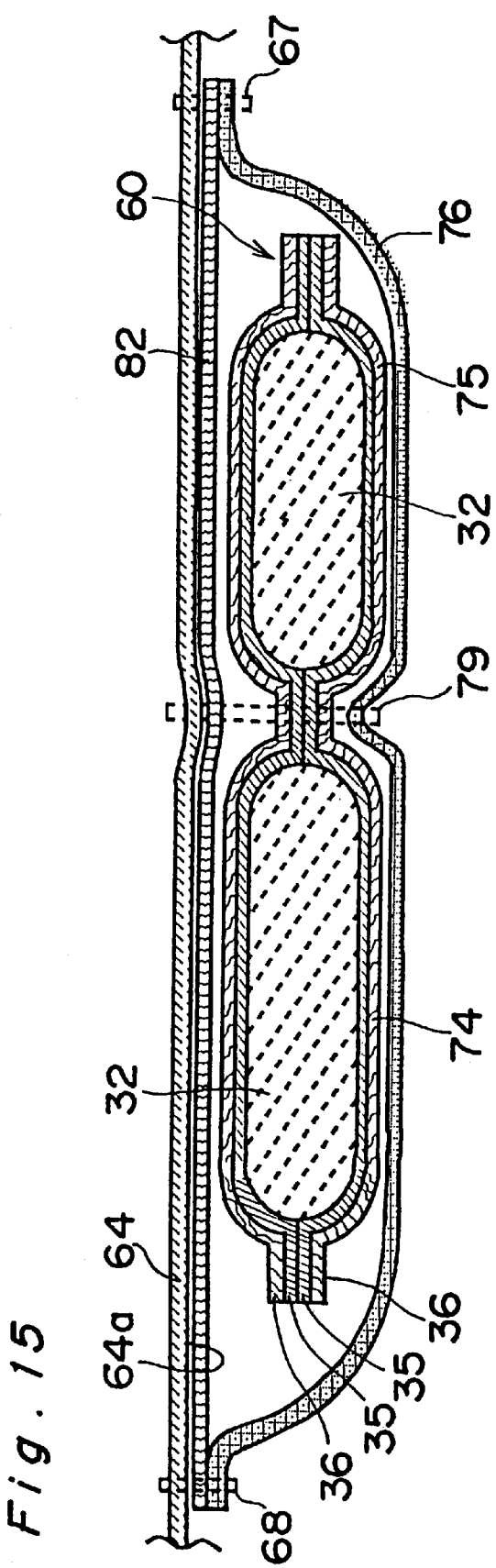

In a third embodiment of the invention shown in FIGS. 14 and 15, an impact absorber 82 is interposed between the waist protection member 60 and the inside 64a of the side fabric piece 64.

It is preferred that the impact absorber 82 employs a sheet material having a higher hardness than at least the sheet material constituting the inner layer 35 of the waist protection member 60. Specifically, a usable sheet material has a hardness (A Scale) on the order of 5 to 90 and more particularly of 10 to 30 as determined by the durometer hardness test set forth in JIS 1986K7215.

Sheet materials such as those formed of synthetic leather, natural leather, mesh articles, elastomer, synthetic resin materials and the like can be usable as the impact absorber 82. The use of the synthetic leather is particularly preferred for its permeability, bendability, wash resistance and the like. The thickness of the impact absorber is preferably on the order of 1 to 3 mm and more preferably of 1.5 to 2.5 mm.

The synthetic leather may be fabricated by the general method. For instance, nonwoven fabric such as of polyester is impregnated with a solution containing polyurethane and then treated with a nonsolvent solution for solidification of polyurethane, thereby allowing polyurethane to set on the nonwoven fabric.

In this embodiment, the impact absorber 82 is formed of the synthetic leather (Clarino® of Kuraray Co.,Ltd).

The impact absorber 82 has substantially the same or slightly smaller area than the lining fabric piece 76. The impact absorber 82 and the lining fabric piece 76 are securely sewn to the side fabric piece 64 on the seam sections 67, 68. The impact absorber 82 and the lining fabric piece 76 are also secured to the side fabric piece 64 on the seam sections 79, 80 defined along the grooves 78a, 78b of the waist protection member 60.

Although the grooves 78a, 78b of the waist protection member 60 have a smaller thickness than the chambers 74, 75, the impact applied to them is reduced by impact absorber 82. This leads to a sure prevention of the rupture of the grooves 78a, 78b. In addition, the provision of the impact absorber 82 permits the impact force applied to a narrow area of the waist protection member 60 to be dissipated in the compartment chambers 74 and the auxiliary chambers 75, resulting in efficient impact absorption.

The configuration of the other portions and the operation of the third embodiment are the same as those of the aforementioned second embodiment.

It is noted that the impact absorber may be interposed between the waist protection member 60 and the lining fabric piece 76. Otherwise, the impact absorbers may be interposed in both places between the waist protection member 60 and the side fabric piece 64 and between the waist protection member 60 and the lining fabric piece 76.

Fourth Embodiment

Figure 16:
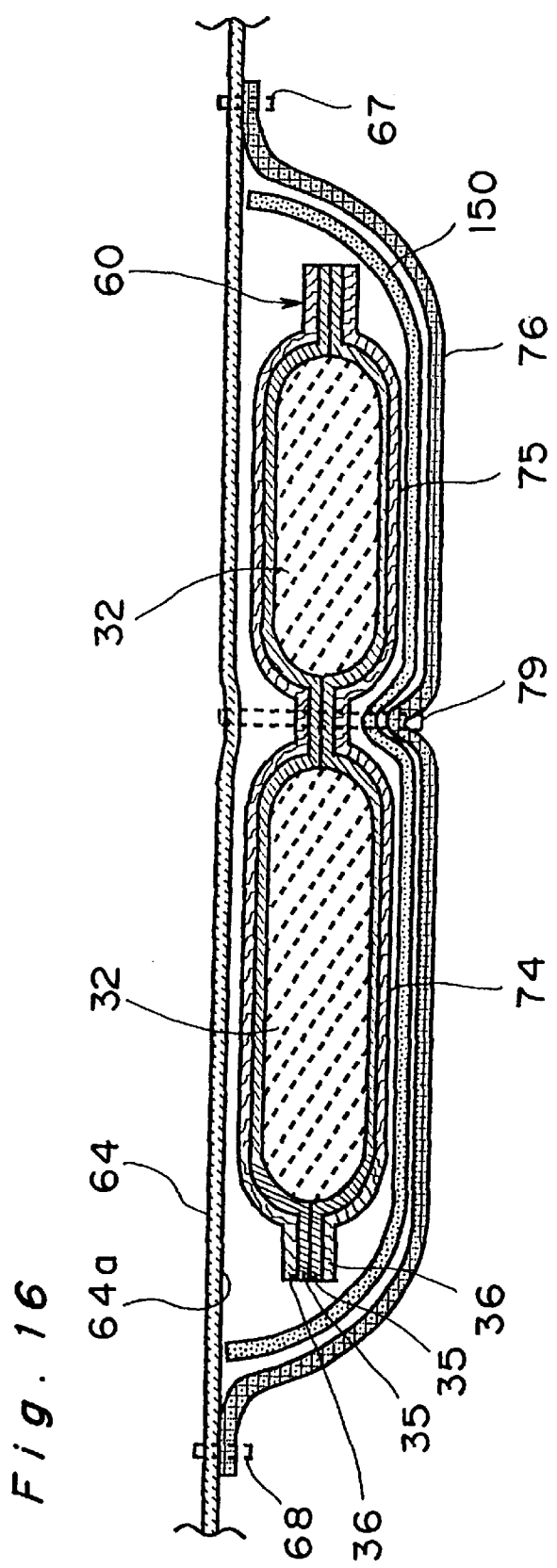

In a fourth embodiment of the invention shown in FIG. 16, a plate-like impact absorber 150 of a foamed material, such as thermoplastic elastomer foam, acrylic polymer foam or the like, is interposed between the waist protection member 60 and the lining fabric piece 76.

Examples of the foamed thermoplastic elastomer material include olefin foams, urethane foams, polyamide foams and polyester foams. As to the foaming method, any method may be used, which includes chemical foaming methods utilizing a foaming agent or the like, and physical foaming methods such as gas injection.

Examples of the foamed acrylic polymer material include polymer containing acrylic monomer, e.g. polymer containing an acrylate monomer and another monomer component. Examples of the acrylate component include ethyl acrylate, methylacrylate acrylate2-ethylhexyl and the like. As the another monomer component, a monomer comprised of acrylic acid, methacrylate, acrylamide or the like may be used for improving the flexibility and weatherability of the copolymer.

Where the impact absorber 150 of such a foamed material is provided, the impact to the human body due to fall or the like can be absorbed not only by the waist protection member 60 but also by this impact absorber 150. Hence, in the fourth embodiment, the thickness of the compartment chambers 74 and auxiliary chamber 75 can be decreased to about 5.5 mm for reducing the weight of the waist protection member 60. The waist protection member 60 reduced in weight provides improved wear comfort and also reduces discomfort to the wearer associated with movement.

Likewise to the third embodiment, the impact absorber of the foamed material may be interposed between the waist protection member 60 and the inside 64a of the side fabric piece 64. Alternatively, the impact absorber of the foamed materials may be interposed in both places between the waist protection member 60 and the side fabric piece 64 and between the waist protection member 60 and the lining fabric piece 76.

The configuration of the other portions and the operation of the fourth embodiment are the same as those of the third embodiment so that same elements are respectively denoted by same reference numerals.

Fifth Embodiment

Figure 17:
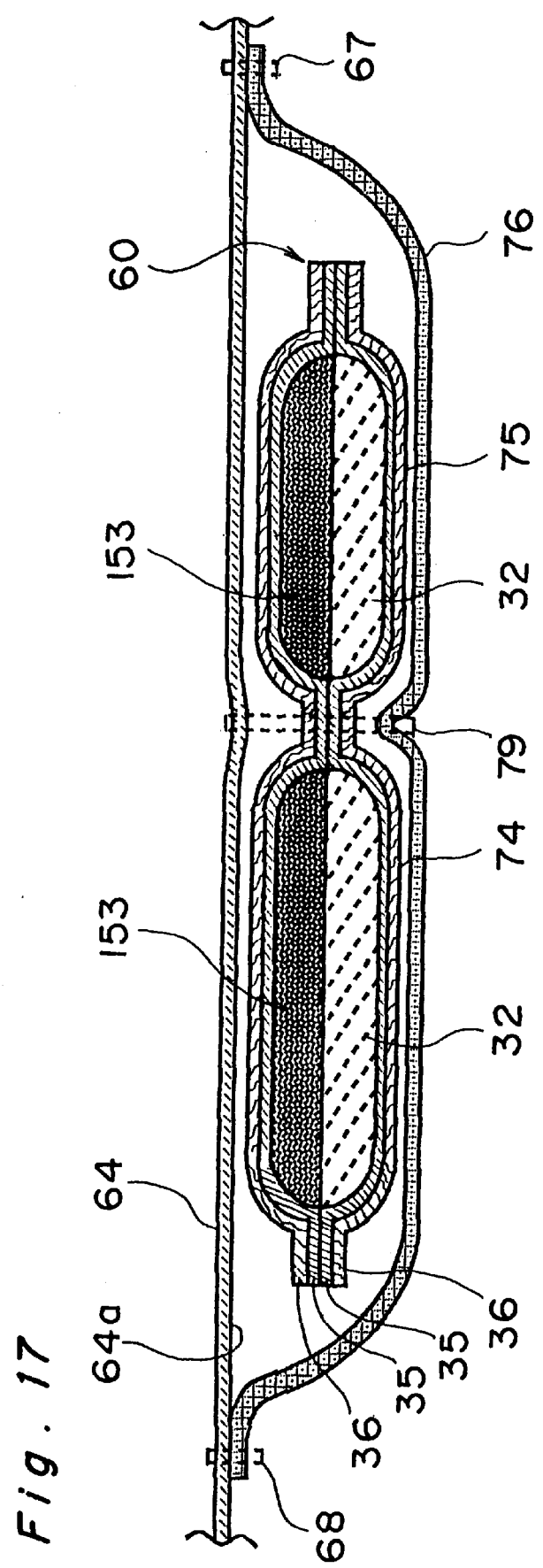

In a waist protection member according to a fifth embodiment of the invention shown in FIG. 17, the gel-like substance 32 is filled in the compartment chambers 74 and the auxiliary chambers 75 on the side of the lining fabric piece 76 while a foamed material 153, such as of the aforementioned thermoplastic elastomer foam, acrylic copolymer foam or the like, is filled therein on the side of the side fabric piece 64. With such a structure, the waist protection member may be reduced in weight as compared to the case where the compartment chambers 74 and auxiliary chambers 75 are filled with only the gel-like substance 32.

In FIG. 17, the gel-like substance 32 is filled in the compartment chambers 74 and auxiliary chambers 75 to a depth equivalent to ½ of the thickness thereof while the foamed material 153 is filled therein to the remaining ½ of the thickness thereof. However, the filling ratio of the gel-like substance 32 and the foamed material 153 should not be limited to this. Further, the foamed material 153 may be filled in the chambers on the side of the lining fabric piece 76 while the gel-like substance 32 may be filled therein on the side of the side fabric piece 64.

The configuration of the other portions and the operation of the fifth embodiment are the same as those of the third embodiment so that same elements are respectively denoted by same reference numerals.

Sixth Embodiment

Figure 18:
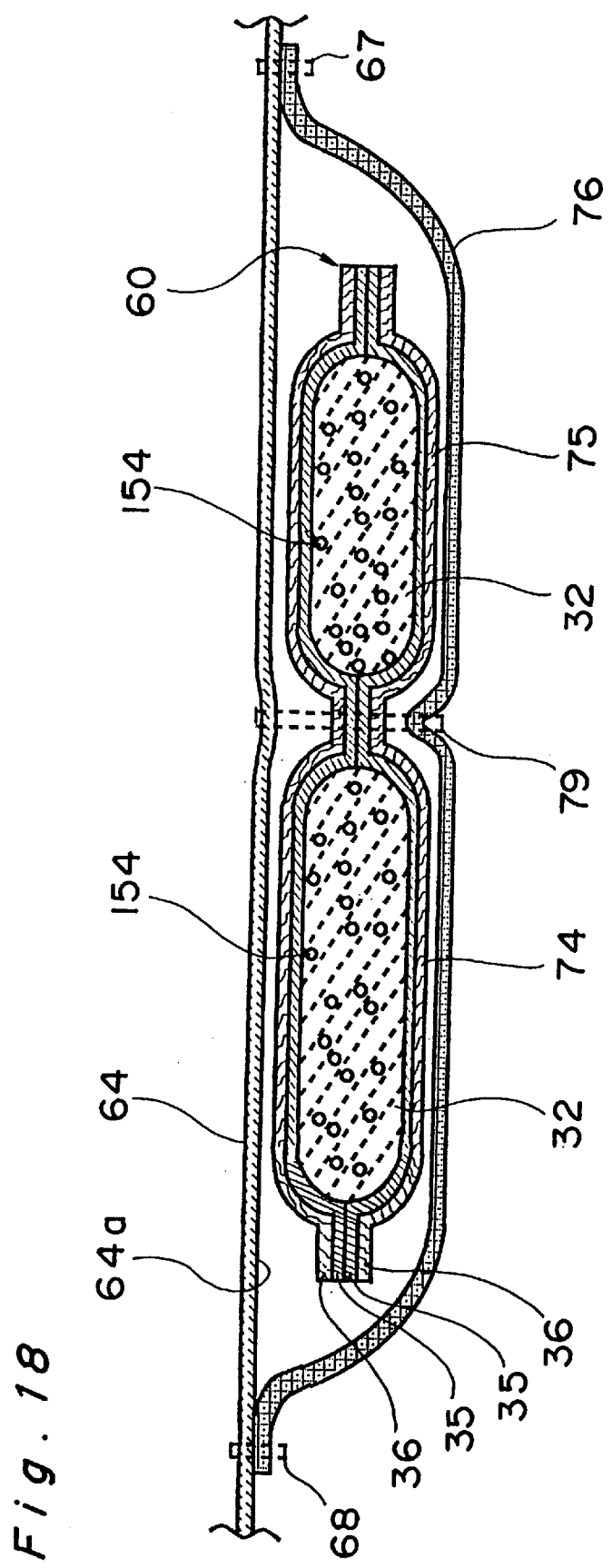

In a waist portion protection member according to a sixth embodiment of the invention shown in FIG. 18, the gel-like substance 32 in the compartment chambers 74 and auxiliary chambers 75 includes a plurality of voids 154. The voids 154 are filled with air. The inclusion of such voids 154 also contributes to reducing weight of the gel-like substance 32, resulting in the enhanced wear comfort and the decreased discomfort associated with movement.

In order to ensure the adequate impact absorption, the total volume of the voids 154 is preferably not more than 5% of the volume of the gel-like substance 32 in each compartment chamber 74 and auxiliary chamber 75. In addition, the gel-like substance 32 preferably has a density of not more than 0.6 g/cm$^3$.

The configuration of the other portions of the sixth embodiment is the same as that of the third embodiment so that same elements are respectively denoted by same reference numerals.

Seventh Embodiment

Figure 19:
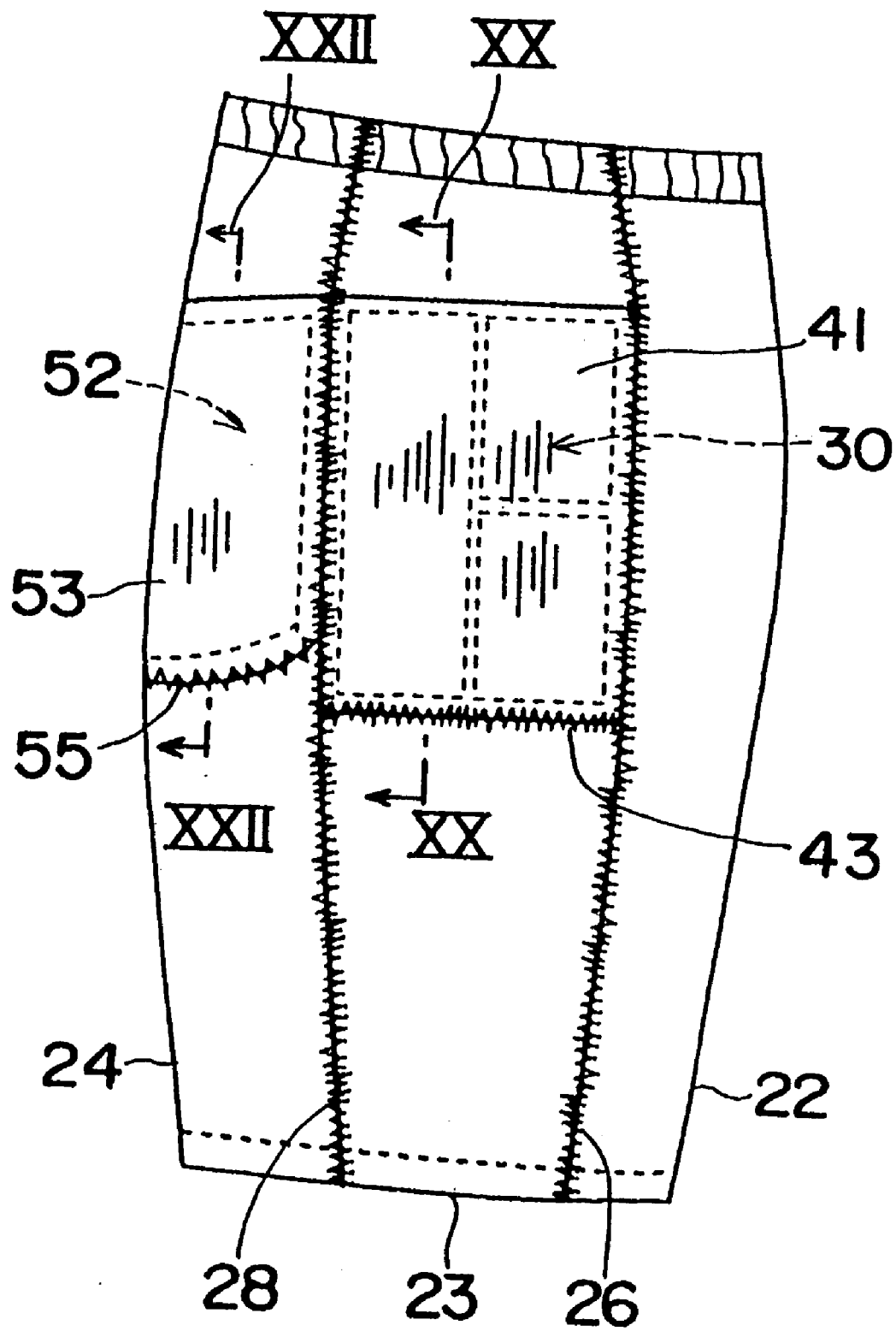
Figure 20:
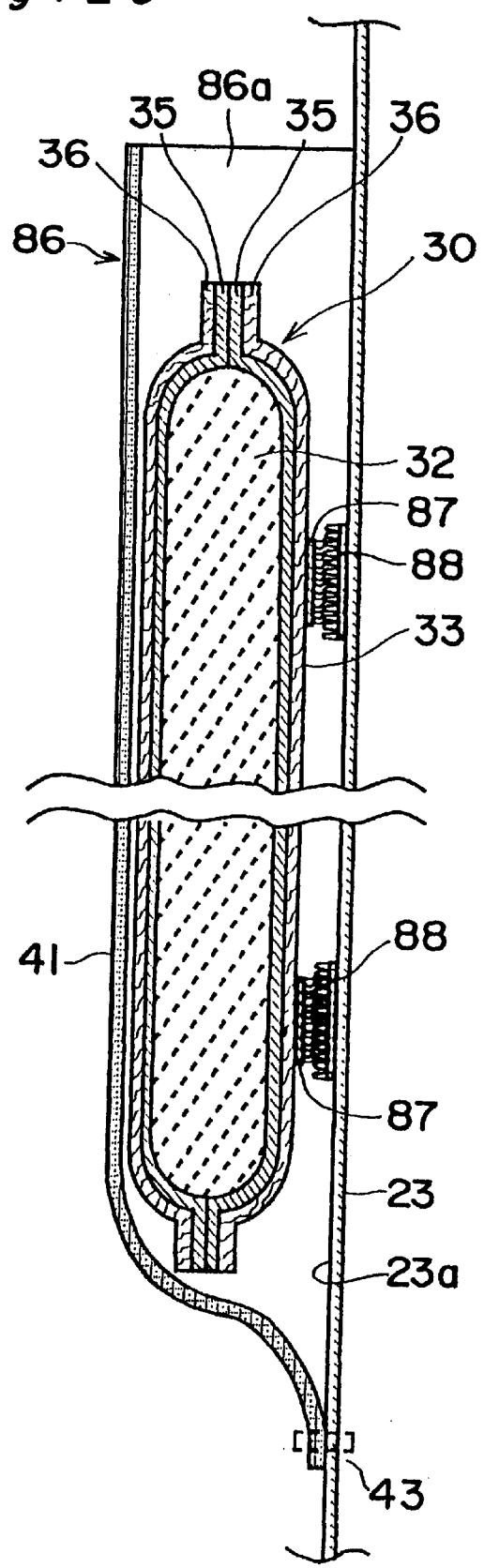
Figure 21:
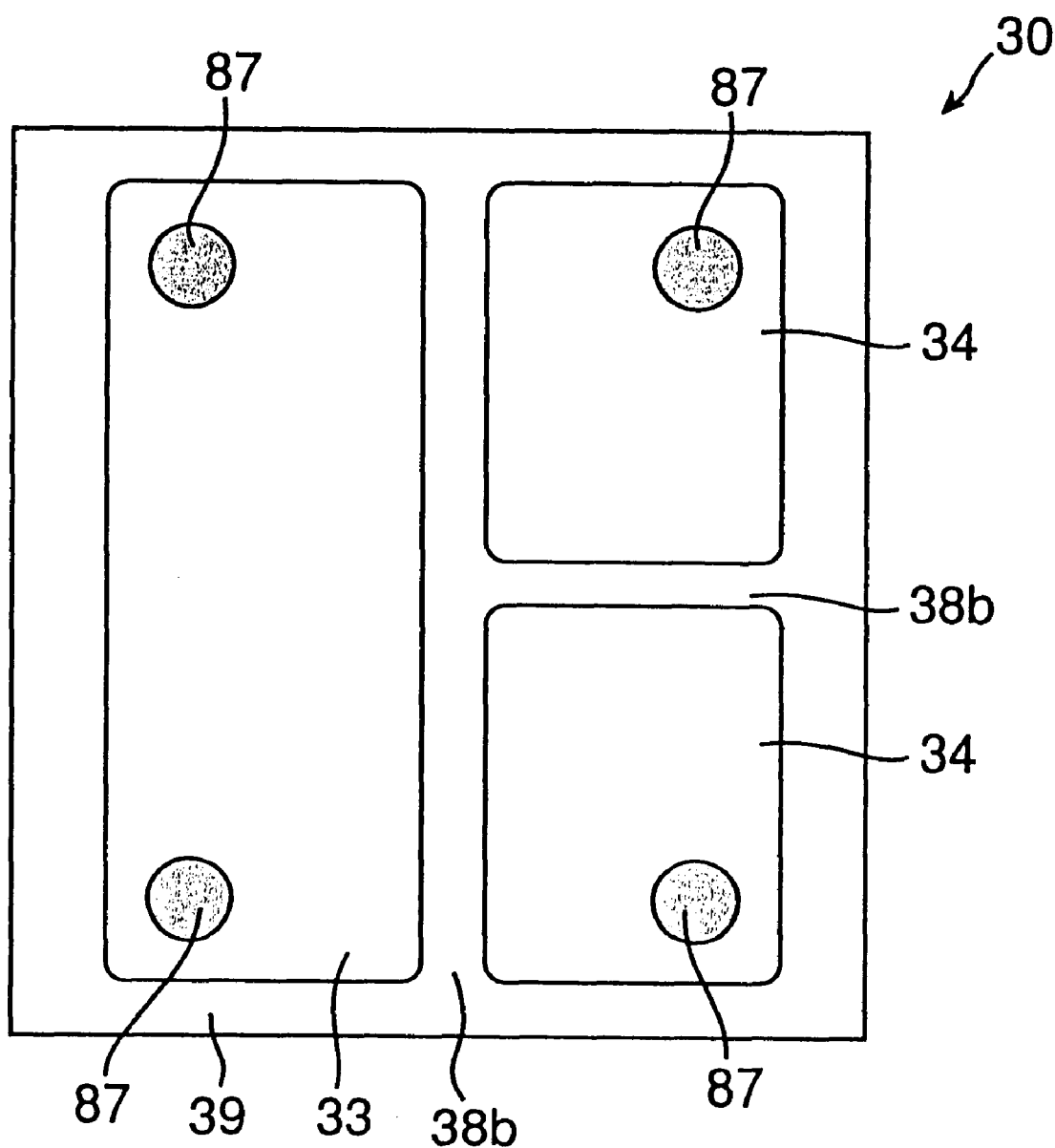

In a seventh embodiment of the invention shown in FIGS. 19 to 21, the lining fabric piece 41 disposed in correspondence to the attachment position of the waist protection member 30 defines a pocket 86 which includes the seam sections 26, 28, 43 extended along the lateral sides and the lower side of the four peripheral sides of the lining fabric piece 41 and which opens at an opening 86a at the top. The waist protection member 30 has securing fasteners 87 bonded thereto by virtue of an adhesive or the like. The fasteners 87 are positioned at four corners of a face of the waist protection member 30 opposite to the inside 23a of the side fabric piece 23. In correspondence to these securing fasteners 87, securing fasteners 88 are also bonded to a portion of the inside 23a of the side fabric piece 23, i.e. the portion defining an inside portion of the pocket section 86.

The waist protection member 30 is inserted in an interior of the pocket 86 through the opening 86a and secured to the side fabric piece 23 by engagement between the securing fasteners 87, 88. On the other hand, the waist protection member 30 can be taken out from the opening 86a after releasing the securing fasteners 87, 88 from the engagement.

Figure 22:
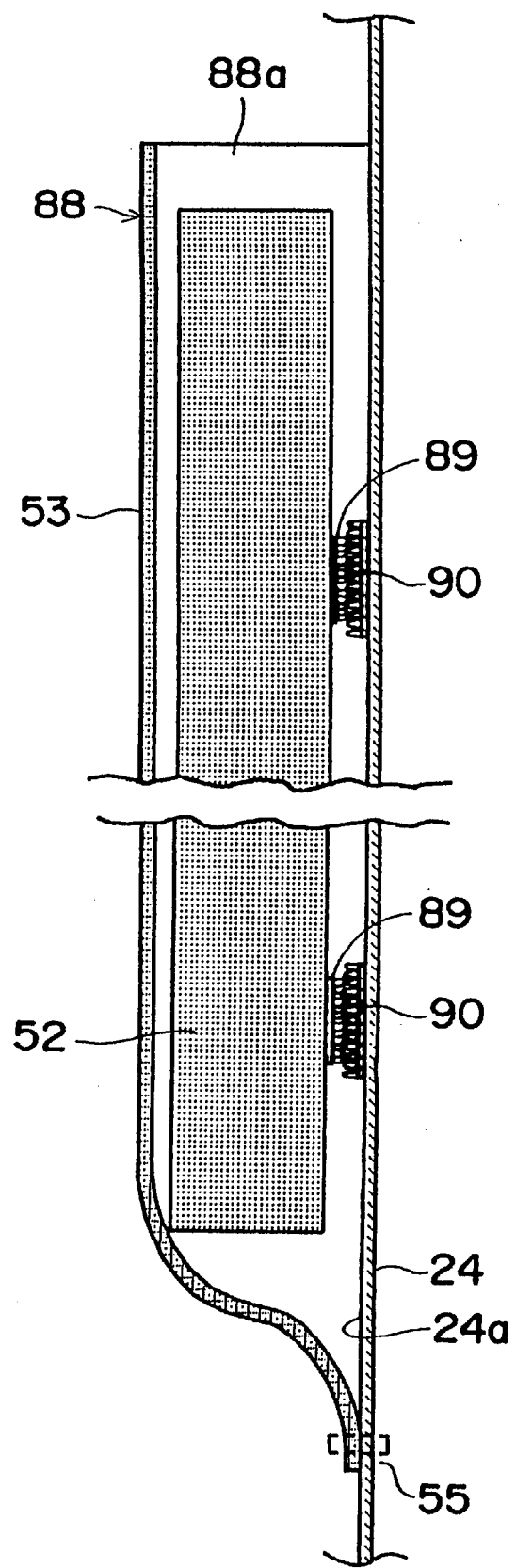
Figure 23:
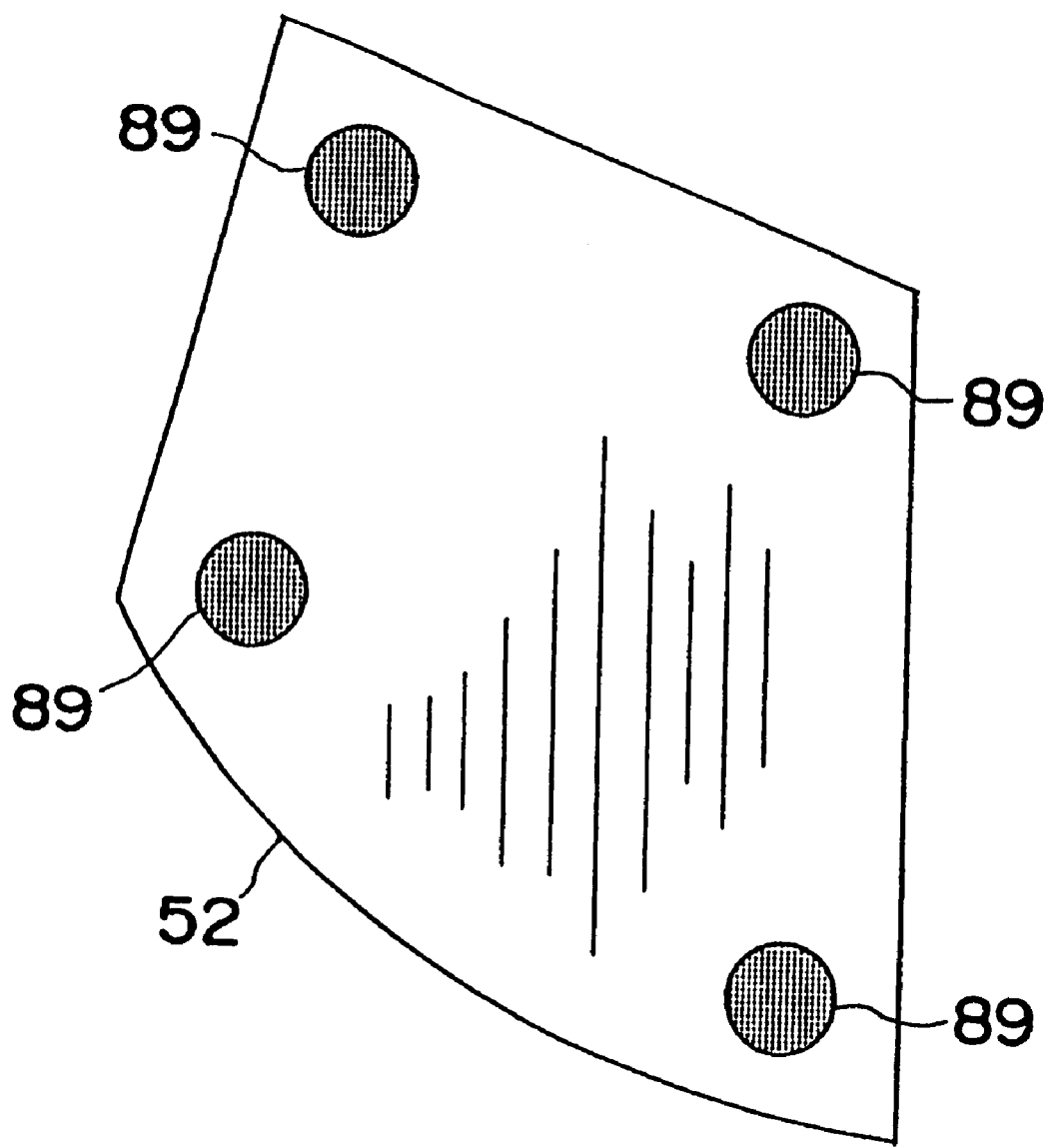

As shown in FIGS. 19 and 22, the rear fabric piece 24 is also formed with a pocket 88 on the inside 24a thereof the pocket 88 including the seam sections 28, 29, 55 extended along the lateral sides and the lower side of the lining fabric piece 53 and opening at an opening 88a at the top. As shown in FIG. 23, the buttock protection member 52 is provided with securing fasteners 89 which are located at four corners of a face thereof opposite to the inside 24a of the rear fabric piece 24. In correspondence to these fasteners 89, securing fasteners 90 are also disposed at places on the inside 24a of the rear fabric piece 24 which defines an inside portion of the pocket 88. Thus, the buttock protection member 52 may be securely placed within or removed from the pocket 88 by bringing the securing fasteners 89, 90 into or out of engagement.

Where the waist protection member 30 and the buttock protection member 52 are removably attached to the long pants 21, it is advantageous in that the waist protection member 30 and the buttock protection member 52 can be removed from the long pants 21 when the pants are washed.

The configuration of the other portions and the operation of the seventh embodiment are the same as those of the aforementioned first embodiment.

Eighth Embodiment

Figure 24:
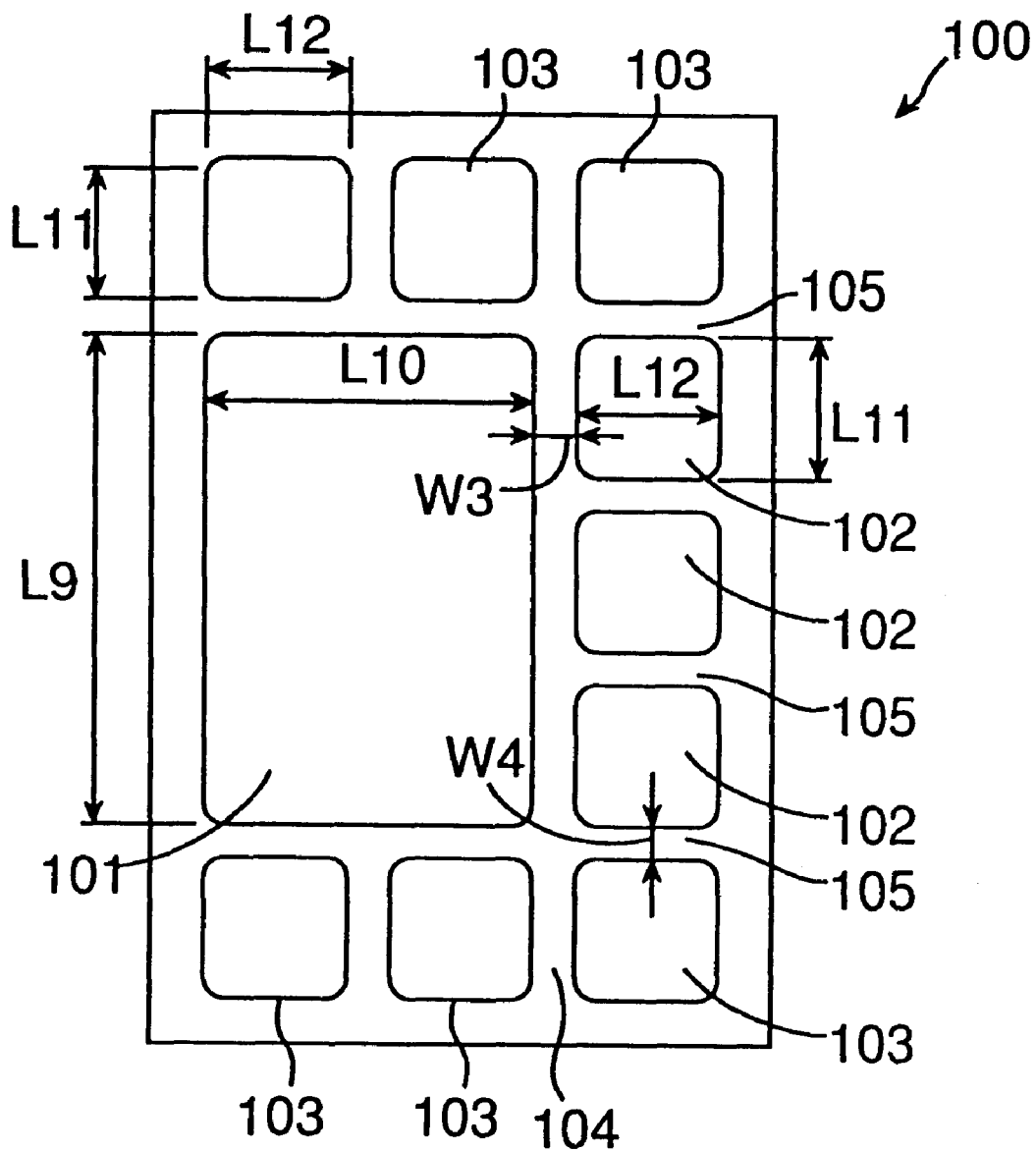

FIG. 24 illustrates a waist protection member 100 according to an eighth embodiment of the invention.

In the waist protection member 100, three auxiliary chambers 102 are vertically juxtaposed near one side of a primary chamber 101. A row of three auxiliary chambers 103 a is respectively disposed above and under the primary chamber 101 and the auxiliary chambers 102.

The primary chamber 101 is of a flat rectangular parallelepiped, having a thickness of 7.5 mm, a vertical length L9 of 120 mm and a transverse length L10 of 77 mm. The auxiliary chamber 102 is shaped like a square, having a thickness of 7.5 mm, a vertical length L11 and a transverse length L12 of 35 mm. Widths W3, W4 of grooves 104, 105 are 7 mm. The auxiliary chamber 103 has the same dimensions as the auxiliary chamber 102.

In the eighth embodiment, the auxiliary chambers 103 are arranged above and under the primary chamber 101. Owing to this arrangement, the impact force applied to areas vertically spaced from the greater trochanter may be absorbed, so that the impact transferred to the greater trochanter is reduced.

Ninth Embodiment

Figure 25:
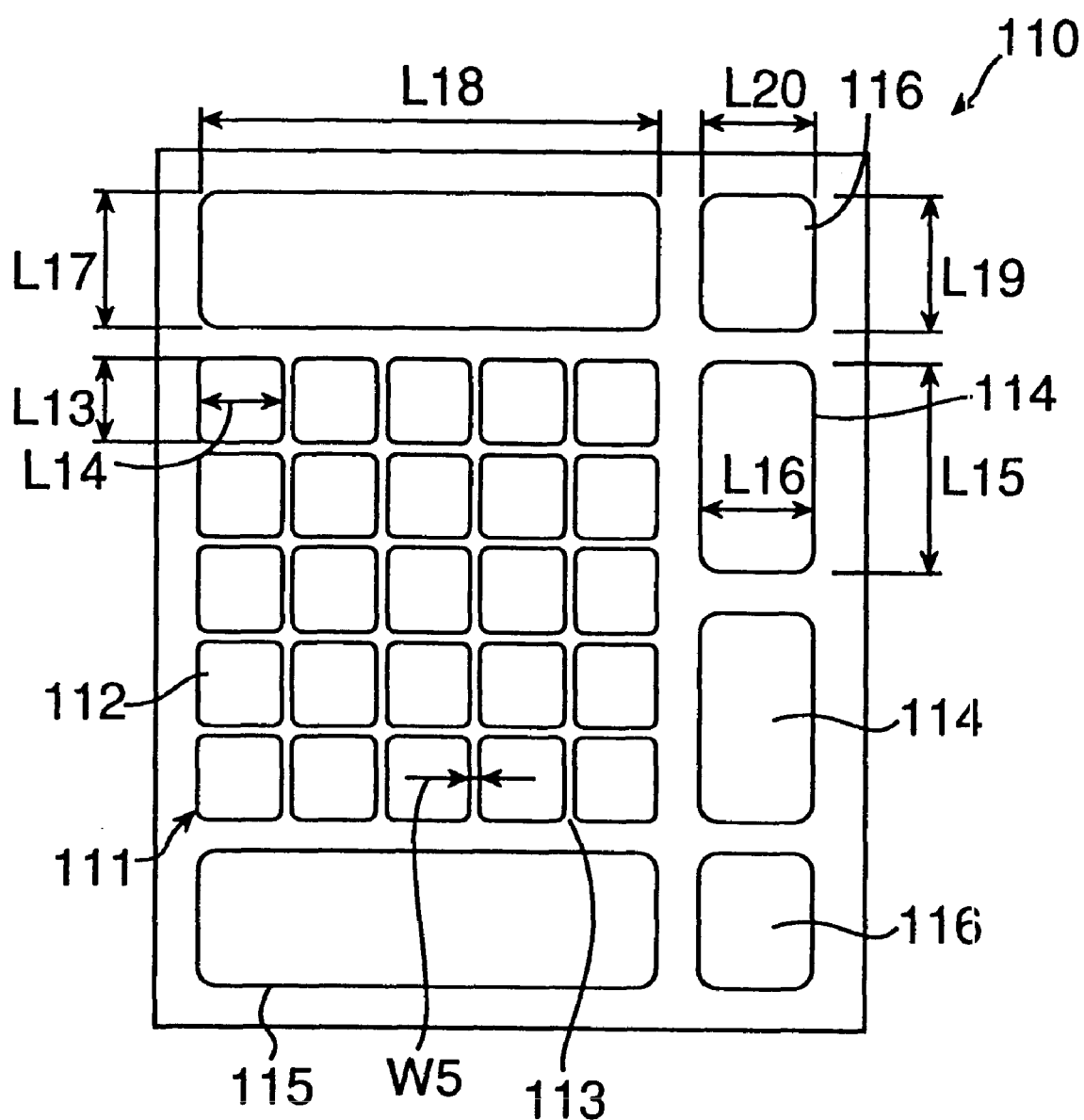
Figure 26:
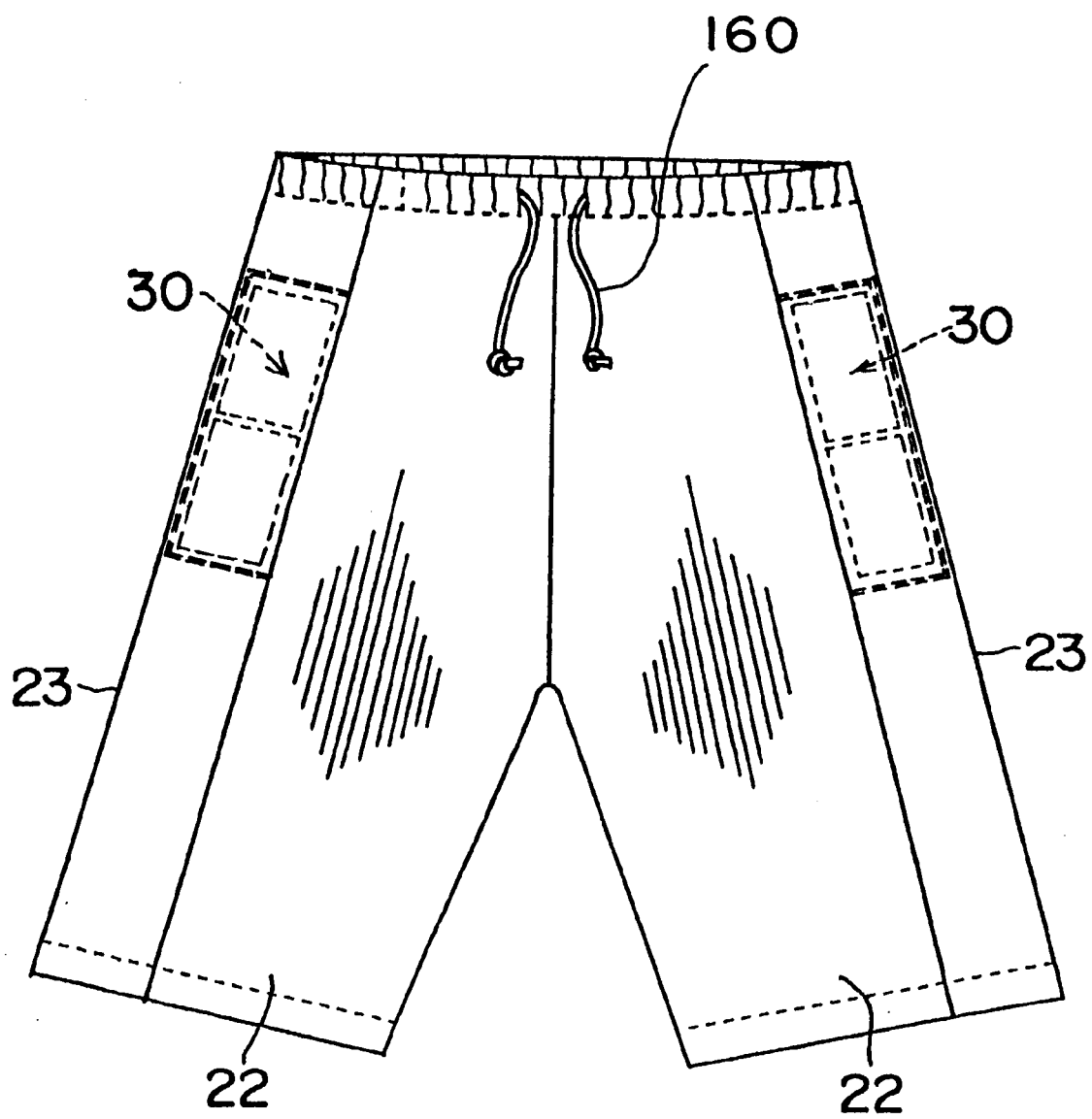

FIG. 25 illustrates a waist protection member 110 according to a ninth embodiment of the invention.

In this waist protection member 110, a primary chamber 111 consists of a total number of 25 compartment chambers 112 in an arrangement consisting of 5 compartment chambers 112 in the vertical direction and 5 compartment chambers 112 in the transverse direction. Each compartment chamber 112 is 18 mm in both the vertical length L13 and the transverse length L14. A groove 113 for partitioning the compartment chambers 112 is 2 mm in width W5. The primary chamber 111 as a whole is 98 mm in both the vertical and transverse lengths.

Forwardly of the primary chamber 111, there are vertically juxtaposed first auxiliary chambers 114 each shaped like a vertically elongated rectangle. Each first auxiliary chamber 114 has a vertical length L15 of 45 mm and a transverse length L16 of 25 mm.

Second auxiliary chambers 115 each in the form of a transversely elongated rectangle are disposed above and below the primary chamber 111. Each second auxiliary chamber 115 has a vertical length L17 of 30 mm and a transverse length L18 of 98 mm.

Third auxiliary chambers 116, which are vertically elongated, are disposed at places above and below the two first auxiliary chambers 114. Each third auxiliary chamber 116 has a vertical length L19 of 30 mm and a transverse length L20 of 25 mm.

The compartment chambers 112 and the first to the third auxiliary chambers 114 to 116 all have a thickness of 7.5 mm.

In the ninth embodiment, as described above, the primary chamber 111 is composed of the small volume compartment chambers 112 so as to achieve surer conformability to the movement of the human body at the area corresponding to the greater trochanter 1a.

It is to be appreciated that the present invention should not be limited to the embodiments thereof and various modifications thereto may be made.

Firstly, the shapes of the primary chamber and auxiliary chambers are not limited to the aforementioned flat rectangular parallelepiped but may be in the form of a circular cylinder, an elliptical cylinder and any polygonal pillar like prism However, whatever shape the primary chamber takes, the primary chamber preferably has a contact area with the human body surface within the range on the order of 20 to 200 $cm^2$. Further, whatever shape the auxiliary chamber takes, the auxiliary chamber preferably has a contact area with the human body surface within the range on the order of 5 to 50 $cm^2$.

In particular, where the primary chamber is of the flat rectangular parallelepiped, the vertical length thereof is preferably within the range of 20 to 240 mm and the transverse length thereof is preferably within the range of 50 to 150 mm. Where the auxiliary chamber is of the flat rectangular parallelepiped, the vertical length thereof is preferably within the range of 10 to 80 mm and the transverse length thereof is preferably within the range of 10 to 80 mm. Additionally, the thickness of the primary chamber and auxiliary chamber is preferably not less than 3 mm and not more than 10 mm. This is because the thickness of less than 3 mm cannot attain sufficient impact absorption while the thickness excessive of 10 mm results in the waist protection member which is too heavy to be suitable for common wear. Further, the peripheral walls of the primary chamber and auxiliary chamber may be formed of only the urethane resin sheet or the soft vinyl chloride sheet, dispensing with the outer layer.

According to the foregoing embodiments of the invention, the waist protection member is attached to the inside of the fabric pieces constituting the long pants or short pants. Instead, the waist protection member may be attached to the outside of the fabric pieces. It is noted that the attachment of the protection member to the inside of the fabric pieces is more preferred in terms of the wear comfort, ease in wearing or taking off the pants, good aesthetic appearance and the like.

Besides the aforesaid long pants and short pants, the waist protection member may also be secured to or removably attached to other garments such as trousers, skirts and the like. In these cases, the waist protection member is preferably attached to the inside of the fabric piece.

The fabrication method for the waist protection member is not limited to the foregoing method. The protection member may be fabricated in a manner that a urethane rubber sheet previously formed with chambers of a predetermined shape at predetermined places thereof is bonded to a soft plastic sheet and thereafter silicone gel is injected into the chambers.

In the foregoing embodiments, the long pants and the like provided with the waist protection member are prevented from slipping down over the wearer'sbody by virtue of an elastic band (elastic waistband) inserted in a portion of the pants encircling the wearer's waist. However, in addition to the elastic waistband, a drawstring 160 such as formed of an acrylic cord may be provided for strapping. Many of the long pants or the like provided with the inventive waist protection member are used by the elderly whose waist sizes vary widely from person to person. Therefore, the provision of the drawstring 160 permits the long pants or the like to be adjusted for the waist size according to individual wearer's waist size, thereby preventing the long pants or the like from slipping down over the wearer's body.

What is claimed is:

1. A waist protection member comprising:
   a primary chamber to be placed over a first area of the human body that includes at least an area of the human body corresponding to a greater trochanter of a femur, with said primary chamber being filled with a gel-like substance; and
   at least two auxiliary chambers which are vertically juxtaposed and are to be placed over at least second and third areas, respectively, of the human body forwardly of the first area, with said auxiliary chambers each being filled with a gel-like substance and each having a cross-sectional area corresponding to the second and third areas, respectively, that is less than a cross-sectional area of said primary chamber that corresponds to the first area.

2. The waist protection member according to claim 1, wherein said gel-like substance filled into said primary chamber is the same as said gel-like substance filled into said auxiliary chambers.

3. The waist protection member according to claim 2, wherein said gel-like substance filled into said primary chamber and said auxiliary chambers comprises silicone gel or urethane gel.

4. The waist protection member according to claim 2, wherein a thickness of said primary chamber and said auxiliary chambers is not less than 3 mm and not more than 10 mm.

5. The waist protection member according to claim 2, wherein said primary chamber comprises a plurality of compartment chambers arranged in close proximity to one another.

6. The waist protection member according to claim 2, wherein a peripheral wall of said primary chamber and said auxiliary chambers comprises a urethane resin sheet or a soft vinyl chloride sheet.

7. The waist protection member according to claim 2, wherein a peripheral wall of said primary chamber and said auxiliary chambers comprises an inner layer of a urethane resin sheet or a soft vinyl chloride sheet, and an outer layer of a knit textile material.

8. A waist protection member comprising:
   a primary chamber to be placed over a first area of the human body that includes at least an area ofthe human body corresponding to a greater trochanter of a femur, with said primary chamber being filled with a gel-like substance and a foamed material; and
   an auxiliary chamber to be placed over a second area of the human body forwardly of the first area, with said auxiliary chamber being filled with said gel-like substance and said foamed material.

9. A garment for a lower body part, comprising:

a waist protection member that includes a primary chamber and at least two auxiliary chambers, with said primary chamber to be placed over a first area of the human body that includes at least an area of the human body corresponding to a greater trochanter of a femur, and said primary chamber being filled with a gel-like substance; and said at least two auxiliary chambers being vertically juxtaposed and to be placed over at least second and third areas, respectively, of the human body forwardly of the first area, and said auxiliary chambers each being filled with a gel-like substance and each having a cross-sectional area corresponding to the second and third areas, respectively, that is less than a cross-sectional area of said primary chamber that corresponds to the first area.

10. The garment according to claim 9, wherein said gel-like substance filled into said primary chamber is the same as said gel-like substance filled into said auxiliary chambers.

11. An underwear for a lower body part, comprising:

a waist protection member that includes a primary chamber and at least two auxiliary chambers, with said primary chamber to be placed over a first area of the human body that includes at least an area of the human body corresponding to a greater trochanter of a femur, and said primary chamber being filled with a gel-like substance; and said at least two auxiliary chambers being vertically juxtaposed and to be placed over at least second and third areas, respectively, of the human body forwardly of the first area, and said auxiliary chambers each being filled with a gel-like substance and each having a cross-sectional area corresponding to the second and third areas, respectively, that is less than a cross-sectional area of said primary chamber that corresponds to the first area.

12. The underwear according to claim 11, wherein said gel-like substance filled into said primary chamber is the same as said gel-like substance filled into said auxiliary chambers.

13. A garment for a lower body part, comprising:

a waist protection member that includes a primary chamber and at least two auxiliary chambers, with (i) said primary chamber to be placed over a first area of the human body that includes at least an area of the human body corresponding to a greater trochanter of a femur, and said primary chamber being filled with a gel-like substance; and (ii) said at least two auxiliary chambers being vertically juxtaposed and to be placed over at least second and third areas, respectively, of the human body forwardly of the first area, and said auxiliary chambers each being filled with a gel-like substance and each having a cross-sectional area corresponding to the second and third areas, respectively, that is less than a cross-sectional area of said primary chamber that corresponds to the first area;

a lining fabric piece for holding said waist protection member to a back side of a body fabric piece; and an impact absorber interposed between said waist protection member and said lining fabric piece or to be interposed between said waist protection member and the body fabric piece.

14. The garment according to claim 13, wherein said gel-like substance filled into said primary chamber is the same as said gel-like substance filled into said auxiliary chambers.

15. An underwear for a lower body part, comprising:

a waist protection member that includes a primary chamber and at least two auxiliary chambers, with (i) said primary chamber to be placed over a first area of the human body that includes at least an area of the human body corresponding to a greater trochanter of a femur, and said primary chamber being filled with a gel-like substance; and (ii) said at least two auxiliary chambers being vertically juxtaposed and to be placed over at least second and third areas, respectively, of the human body forwardly of the first area, and said auxiliary chambers each being filled with a gel-like substance and each having a cross-sectional area corresponding to the second and third areas, respectively, that is less than a cross-sectional area of said primary chamber that corresponds to the first area;

a lining fabric piece for holding said waist protection member to a back side of a body fabric piece; and an impact absorber interposed between said waist protection member and said lining fabric piece or to be interposed between said waist protection member and the body fabric piece.

16. The underwear according to claim 15, wherein said gel-like substance filled into said primary chamber is the same as said gel-like substance filled into said auxiliary chambers.

17. A waist protection member comprising:

a primary chamber to be placed over a first area of the human body that includes at least an area of the human body corresponding to a greater trochanter of a femur, with said primary chamber being filled with a gel-like substance and a foamed material; and at least two auxiliary chambers which are vertically juxtaposed and are to be placed over at least second and third areas, respectively, of the human body forwardly of the first area, with said auxiliary chambers each being filled with a gel-like substance and a foamed material, and each having a cross-sectional area corresponding to the second and third areas, respectively, that is less than a cross-sectional area of said primary chamber that corresponds to the first area.

18. The waist protection member according to claim 17, wherein said gel-like substance and foamed material filled into said primary chamber is the same as said gel-like substance and foamed material filled into said auxiliary chambers.

19. A waist protection member comprising:

a primary chamber to be placed over a first area of the human body that includes at least an area of the human body corresponding to a greater trochanter of a femur, with said primary chamber being filled with a gel-like substance having voids; and at least two auxiliary chambers which are vertically juxtaposed and are to be placed over at least second and third areas, respectively, of the human body forwardly of the first area, with said auxiliary chambers each being filled with a gel-like substance having voids and each having a cross-sectional area corresponding to the second and third areas, respectively, that is less than a cross-sectional area of said primary chamber that corresponds to the first area.

20. The waist protection member according to claim 19, wherein said gel-like substance filled into said primary chamber is the same as said gel-like substance filled into said auxiliary chambers.

21. The waist protection member according to claim 20, wherein said voids are filled with air.

22. The waist protection member according to claim 20, wherein a total volume of said voids in said primary chamber is not more than 5% of a volume of said gel-like substance in said primary chamber, and a total volume of said voids in said auxiliary chambers is not more than 5% of a volume of said gel-like substance in said auxiliary chambers, respectively.

* * * * *